(12) United States Patent
Lobnitz et al.

(10) Patent No.: US 10,473,680 B2
(45) Date of Patent: Nov. 12, 2019

(54) WHEEL UNIT WITH A LOCATION SENSOR

(71) Applicant: Noa Technologies, Inc., San Francisco, CA (US)

(72) Inventors: Nick Lobnitz, Fenwick (GB); Seth Spiel, San Francisco, CA (US); Jason Van der Schyff, San Francisco, CA (US); Adam Fewtrell, Berlin (DE); Martin Schuster, Berlin (DE); Nelson Pina, Berlin (DE); Pedro Silva, Berlin (DE); Roman Laabs, Berlin (DE)

(73) Assignee: Noa Technologies, Inc., San Francisco, CA (US)

( * ) Notice: Subject to any disclaimer, the term of this patent is extended or adjusted under 35 U.S.C. 154(b) by 0 days.

(21) Appl. No.: 15/707,602

(22) Filed: Sep. 18, 2017

(65) Prior Publication Data

US 2018/0113144 A1   Apr. 26, 2018

Related U.S. Application Data

(60) Provisional application No. 62/412,227, filed on Oct. 24, 2016.

(51) Int. Cl.
| | | |
|---|---|---|
| G01P 3/487 | (2006.01) | |
| G01C 22/00 | (2006.01) | |
| G06K 19/077 | (2006.01) | |
| G07C 5/08 | (2006.01) | |
| H02K 35/02 | (2006.01) | |
| H02K 7/18 | (2006.01) | |
| B62H 5/00 | (2006.01) | |
| B62H 5/20 | (2006.01) | |
| G01C 21/20 | (2006.01) | |
| B60C 19/00 | (2006.01) | |
| B62J 99/00 | (2009.01) | |
| G01P 3/44 | (2006.01) | |
| B62M 6/60 | (2010.01) | |
| B62M 6/75 | (2010.01) | |

(52) U.S. Cl.
CPC .......... *G01P 3/487* (2013.01); *G01C 22/002* (2013.01); *G06K 19/07764* (2013.01); *G07C 5/0841* (2013.01); *H02K 35/02* (2013.01); *B60C 2019/004* (2013.01); *B62J 2099/002* (2013.01)

(58) Field of Classification Search
CPC . G01P 3/487; G01C 22/002; G06K 19/07764; G07C 5/0841; H02K 7/1846; H02K 7/1876; H02K 35/02
See application file for complete search history.

(56) References Cited

U.S. PATENT DOCUMENTS

| | | | |
|---|---|---|---|
| 5,874,792 A | 2/1999 | Chen | |
| 6,446,005 B1 * | 9/2002 | Bingeman | .......... A63B 24/0021 180/167 |
| 2005/0285461 A1 * | 12/2005 | Kitamura | ............... B62M 25/08 310/67 A |
| 2012/0239248 A1 | 9/2012 | Bobbitt | |
| 2016/0280300 A1 | 9/2016 | Latzke | |

* cited by examiner

*Primary Examiner* — David M. Gray
*Assistant Examiner* — Michael A Harrison
(74) *Attorney, Agent, or Firm* — Van Pelt, Yi & James LLP

(57) ABSTRACT

A wheel unit includes a rotating wheel, a wheel axle, and a location sensor. The rotating wheel rotates with respect to the wheel axle. The location sensor is disposed in a fixed position with respect to the wheel axle. The location sensor determines coordinates for a location of the wheel unit.

15 Claims, 19 Drawing Sheets

WHEEL UNIT WITH A LOCATION SENSOR

CROSS REFERENCE TO OTHER APPLICATIONS

This application claims priority to U.S. Provisional Patent Application No. 62/412,227 entitled WHEEL UNIT WITH SPINDLE MOUNTED TRACKING DEVICE filed Oct. 24, 2016 which is incorporated herein by reference for all purposes.

BACKGROUND OF THE INVENTION

Wheeled units are mobile by design. Because of their mobility, tracking the wheeled units is not a simple matter. However, often it is important to be able to locate a wheeled unit especially for the owner or manager of the wheeled unit. This is especially true for units that can range far from their original location.

BRIEF DESCRIPTION OF THE DRAWINGS

Various embodiments of the invention are disclosed in the following detailed description and the accompanying drawings.

DETAILED DESCRIPTION

Figure 1A:
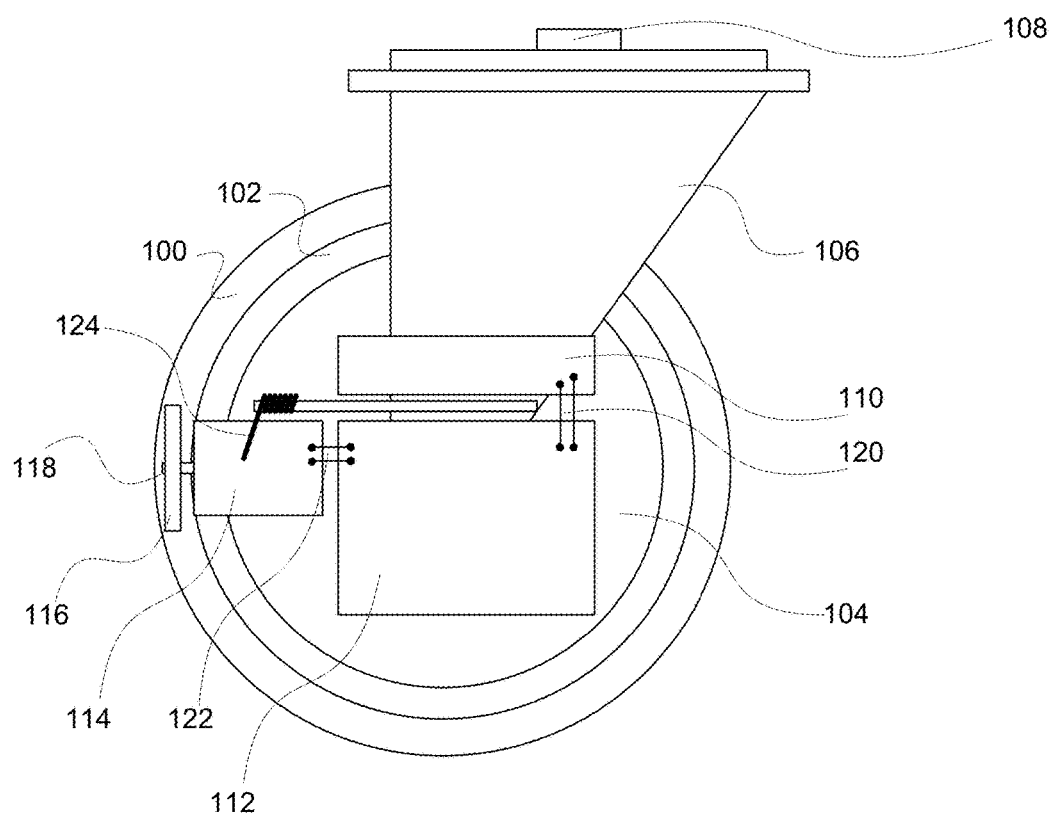
FIG. 1A is a diagram illustrating an embodiment of a side view of a wheel unit.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A wheel unit with a location sensor is disclosed. A wheel unit includes a rotating wheel, a wheel axle, and a location sensor. The rotating wheel rotates with respect to the wheel axle. The location sensor is disposed in a fixed position with respect to the wheel axle. The location sensor determines coordinates for a location of the wheel unit.

A wheel unit with spindle mounted tracking device is disclosed. The wheel unit comprises a rotating wheel, a wheel axle, and a location sensor. The rotating wheel rotates with respect to the wheel axle. The location sensor is disposed to a fixed position with respect to the wheel axle. The location sensor determines Cartesian coordinates to locate the wheel unit.

In the below, spindle refers to the non-rotating center of a wheel, whereas a hub is the rotating center, and the axle supports the bearings. Referencing Auto Industry norms; the spindle includes the axle, and a flange or knuckle depending on the application. The axle is specifically the bit that the bearings rest on, and the flange/knuckle are what connects the wheel to the rest of the vehicle.

In various embodiments, position sensor system comprises one or more of the following: global navigation satellite system (GNSS), quasi-zenith satellite system (QZSS), BeiDou navigation satellite system, Galileo global navigation satellite system, cellular position sensor system, or any other appropriate position sensor system.

In various embodiments, one or more of the following sensors are included with the spindle mounted tracking device: a weight sensor, a speed sensor, a compass, a gyroscope, an air quality sensor, an environmental sensor, or any other appropriate sensor.

In some embodiments, the position sensor system associated with the wheel unit tracking device provides 3 dimensional coordinates over time.

In some embodiments, a wheel unit with an axle mounted communication unit is disclosed. The wheel unit comprises a rotating wheel, a wheel axle, and a wireless communication unit. The rotating wheel rotates with respect to the wheel axle. The wireless communication unit is attached to an antenna, wherein the antenna is disposed in a fixed position with respect to the wheel axle.

Prioritize the antennas based on the priorities for the customer experience. For example, a tracker would prioritize GPS, cellular and BLE in that order.

Maximize the spatial isolation of the antennas (i.e., maximize the physical distance between the antennas to minimize interference).

Place the GPS antenna vertically for a clear and unobstructed line of sight to satellites.

Place the cellular antenna horizontally for a clear and unobstructed line of sight to cell towers.

Place the BLE antenna in a remaining space as isolated from the other antennas as possible.

In some embodiments, a wheel unit that identifies position is disclosed. The wheel unit includes a location sensor and a communication unit. The location sensor determines the wheel location (e.g., coordinates associated with the wheel enabling the determination of a location for the wheel unit). The communication unit provides the wheel location to a server (e.g., the coordinates of the wheel unit—for example, longitude and latitude, are transmitted to a server via wireless communications—for example, cellular communication). In some embodiments, multiple communication modules are included with the communication unit.

In some embodiments, the wheel unit is attached to a mobile item. However, a user may want to acquire or use the mobile item in an unauthorized way or to take it away with them. In this case, any tracking of the unit or device involved in tracking the unit should not be able to be disabled or removed.

In various embodiments, the wheel unit comprises a castor, a bicycle wheel, a cart wheel, a mobile unit wheel, or any other appropriate mobile item.

In some embodiments, the motion of the mobile item is used to generate power for the location sensor and the communication unit.

In some embodiments, a wheel unit comprises a rotating wheel, a wheel axle, and a location sensor. The rotation wheel rotates with respect to the wheel axle. The location sensor is disposed in a fixed position with respect to the wheel axle. The location sensor determines coordinates for a location of the wheel unit. In some embodiments, the wheel unit includes a wireless communication unit. In some embodiments, the wireless communication unit is configured to transmit the location of the wheel unit.

In some embodiments, the wheel unit includes a power generator. In some embodiments, the power generator that generates power using rotation of the rotating wheel with respect to the wheel axle. In some embodiments, power generator charges a battery. In some embodiments, the battery powers the location sensor. In some embodiments, the power generator comprises a friction wheel that turns the power generator using the rotating wheel to turn the friction wheel. In some embodiments, the power generator comprises a gear that turns the power generator using the rotating wheel to turn the gear. In some embodiments, the power generator comprises uses detected changing magnetic fields to generate power as the rotating wheel rotates. In some embodiments, the rotating wheel includes a plurality of fixed magnets used to create the changing magnetic fields. In some embodiments, the location sensor is attached to the wheel axle. In some embodiments, the location sensor is attached to an axle support. The location sensor is attached to a location antenna.

In some embodiments, a wheel unit includes a rotating wheel, a wheel axle, and a wireless communication unit. The rotating wheel rotates with respect to the wheel axle. The wireless communication unit is attached to a communication antenna. The communication antenna is disposed in a fixed position with respect to the wheel axle. In some embodiments, the wheel unit includes a location sensor. In some embodiments, the location sensor is disposed in a fixed position with respect to the wheel axle. In some embodiments, the location sensor senses a location of the wheel unit.

FIG. 1A is a diagram illustrating an embodiment of a side view of a wheel unit. In the example shown, wheel outer layer 100 is supported by wheel outer support 102 and wheel inner support 104. In various embodiments, wheel outer layer 100 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 100 rotates about an axle that is supported by axle support 106. In some embodiments, there are two axle supports—one on either side of the wheel. In some embodiments, there is one axle support—supporting the wheel in a cantilevered fashion. Axle and axle support 106 are fixed and do not rotate with wheel outer layer 100 and wheel outer support 102. In various embodiments, wheel inner support 104 is fixed and attached to axle support 106 and the axle (e.g., a set of bearings enables rotation of wheel outer support 106 with respect to wheel inner support 104), wheel inner support 104 rotates with wheel outer layer 100 and wheel outer support 102 (e.g., a set of bearings enables rotation of wheel inner support 104 with respect to the axle), or any other appropriate rotation arrangement. Friction wheel 116 is placed in contact with wheel outer layer 100 so that friction wheel 116 rotates when wheel outer layer 100 rotates. Contact is maintained between wheel outer layer 100 and friction wheel 116 using a force device (e.g., spring 124). Friction wheel 116 rotates with generator axle 118 to turn a rotor with respect to a stator of generator 114 to generate power. Generator 114 parasitically generates power off of the motion of outer wheel layer 100 to power circuits of circuit unit 112 directly or indirectly using a battery (e.g., battery 110). Power is used to charge battery 110 via connections 120. In some embodiments, generator 114 is directly connected to battery 110. Circuit unit 112 includes a location sensor unit and a wireless communication unit. In various embodiments, location sensor unit comprises a global positioning sensor (GPS), an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 112, generator 122, and battery 110 are fixed to axle support 106 and/or the axle and do not rotate with wheel outer layer 100.

In various embodiments, the location sensor unit and the wireless communication unit (e.g., as part of circuit unit 112) are enclosed and affixed to axle support 106 or axle so as not be removable or disabled. Pivot 108 enables rotation of the wheel unit about a mounting pivot.

Figure 1B:
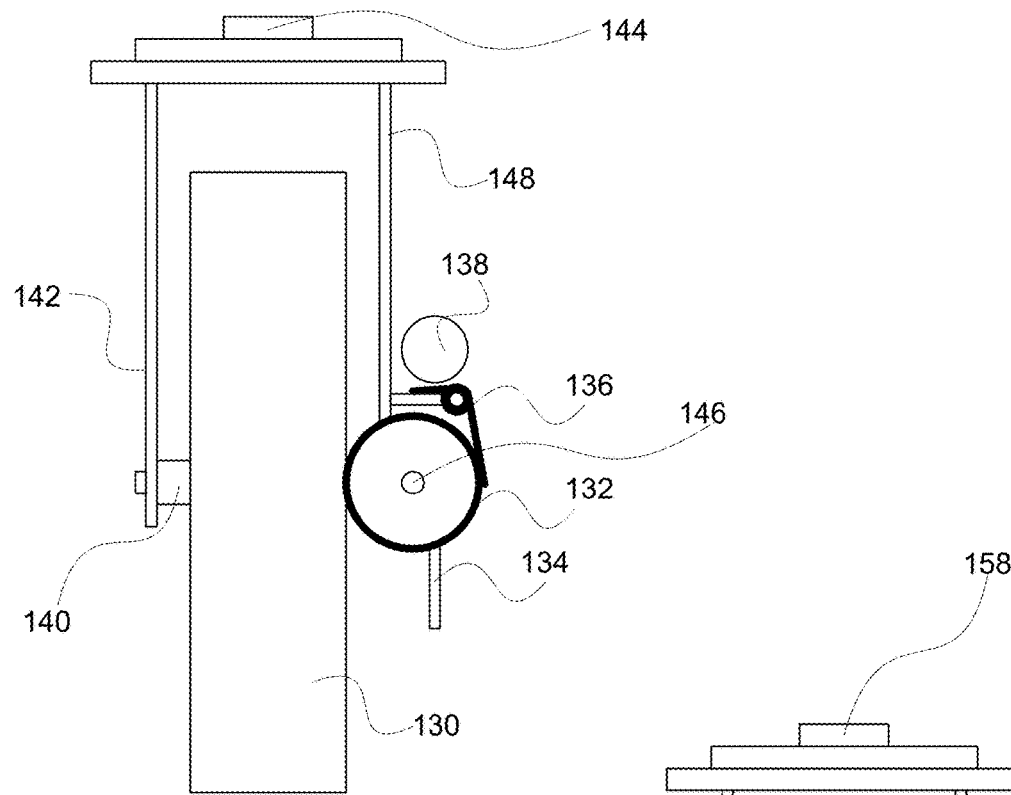
FIG. 1B is a diagram illustrating an embodiment of an end view of a wheel unit.

FIG. 1B is a diagram illustrating an embodiment of an end view of a wheel unit. In some embodiments, the wheel unit of FIG. 1B comprises a different view of wheel unit as FIG. 1A. In the example shown, wheel outer layer 130 is supported by a wheel outer support and a wheel inner support. In various embodiments, wheel outer layer 130 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 130 rotates about axle 140 that is supported by axle support 142. In some embodiments, there are two axle supports (e.g., axle support 142 and axle support 148)—one on either side of the wheel. In some embodiments, there is one axle support—supporting the wheel in a cantilevered fashion. Axle 140 and axle support 142 are fixed and do not rotate with wheel outer layer 130 and a wheel outer support. In various embodiments, a wheel inner support is fixed and attached to axle support 142 and axle 140 (e.g., a set of bearings enables rotation of wheel outer support with respect to a wheel inner support), a wheel inner support rotates with wheel outer layer 130 and a wheel outer support (e.g., a set of bearings enables rotation of a wheel inner support with respect to the axle), or any other appropriate rotation arrangement. Friction wheel 132 is placed in contact with wheel outer layer 130 so that friction wheel 132 rotates when wheel outer layer 130 rotates. Contact is maintained between wheel outer layer 130 and friction wheel 132 using a force device (e.g., spring 136). Friction wheel 132 rotates with generator axle 146 to turn a rotor with respect to a stator of a generator to generate power. The generator parasitically generates power off of the motion of outer wheel layer 130 to power circuits of circuit unit 134 directly or indirectly using a battery (e.g., battery 138). Power is used to charge battery 138. In some embodiments, the generator is directly connected to battery 138. Circuit unit 134 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 134, the generator, and battery 138 are fixed to axle support 148 and/or axle 140 and do not rotate with wheel outer layer 130.

In various embodiments, the location sensor unit and the wireless communication unit (e.g., as part of circuit unit 134) are enclosed and affixed to axle support 142 or axle 140 so as not be removable or disabled. Pivot 144 enables rotation of the wheel unit about a mounting pivot.

Figure 1C:
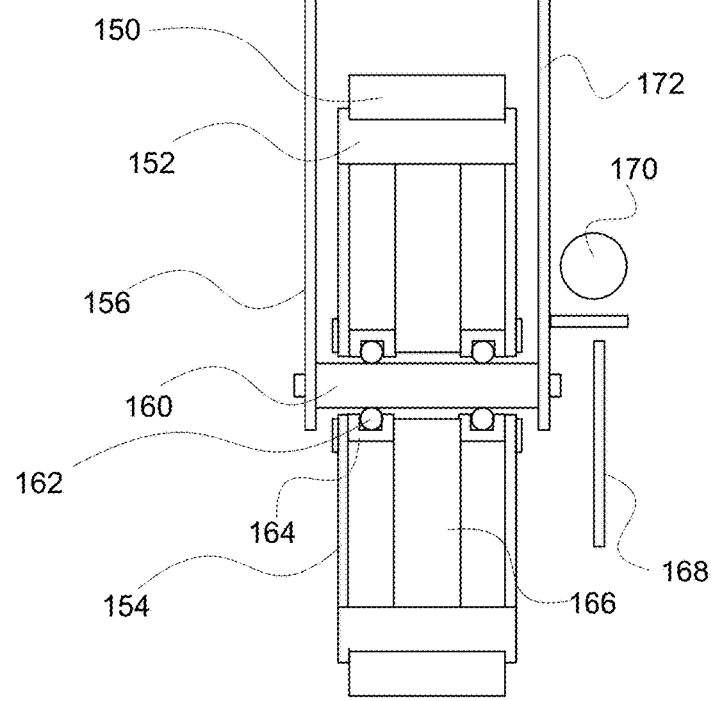
FIG. 1C is a diagram illustrating an embodiment of a cutaway view of a wheel unit.

FIG. 1C is a diagram illustrating an embodiment of a cutaway view of a wheel unit. In some embodiments, the wheel unit of FIG. 1C comprises a section view of wheel unit as FIG. 1A. In the example shown, wheel outer layer 150 is supported by wheel outer support 152 and wheel inner support 166 and/or wheel inner support 154. In various embodiments, wheel outer layer 150 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 150 rotates about axle 160 that is supported by axle support 156. In some embodiments, there are two axle supports (e.g., axle support 156 and axle support 172)—one on either side of the wheel. In some embodiments, there is one axle support—supporting the wheel in a cantilevered fashion. Axle 160 and axle support (e.g., axle support 156 and axle support 172) are fixed and do not rotate with wheel outer layer 150 and wheel outer support 152. Wheel inner support 166 and/or wheel inner support 154 rotates with wheel outer layer 150 and wheel outer support 152 (e.g., a set of bearings—for example, bearing 162 in bearing holder 164—enables rotation of wheel inner support 166 and/or wheel inner support 154 with respect to axle 160). A friction wheel (not shown in FIG. 1C) is placed in contact with wheel outer layer 150 so that the friction wheel rotates when wheel outer layer 150 rotates. Contact is maintained between wheel outer layer 150 and the friction wheel using a force device (e.g., a spring—not shown in FIG. 1C). The friction wheel rotates with a generator axle to turn a rotor with respect to a stator of a generator to generate power. The generator parasitically generates power off of the motion of outer wheel layer 150 to power circuits of circuit unit 168 directly or indirectly using a battery (e.g., battery 170). Power is used to charge battery 170. In some embodiments, the generator is directly connected to battery 170. Circuit unit 168 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 168, the generator, and battery 170 are fixed to axle support 156, axle support 172, and/or axle 160 and do not rotate with wheel outer layer 150.

In various embodiments, the location sensor unit and the wireless communication unit (e.g., as part of circuit unit 168) are enclosed and affixed to axle support 156, axle support 172, or axle 160 so as not be removable or disabled. Pivot 158 enables rotation of the wheel unit about a mounting pivot.

Figure 1D:
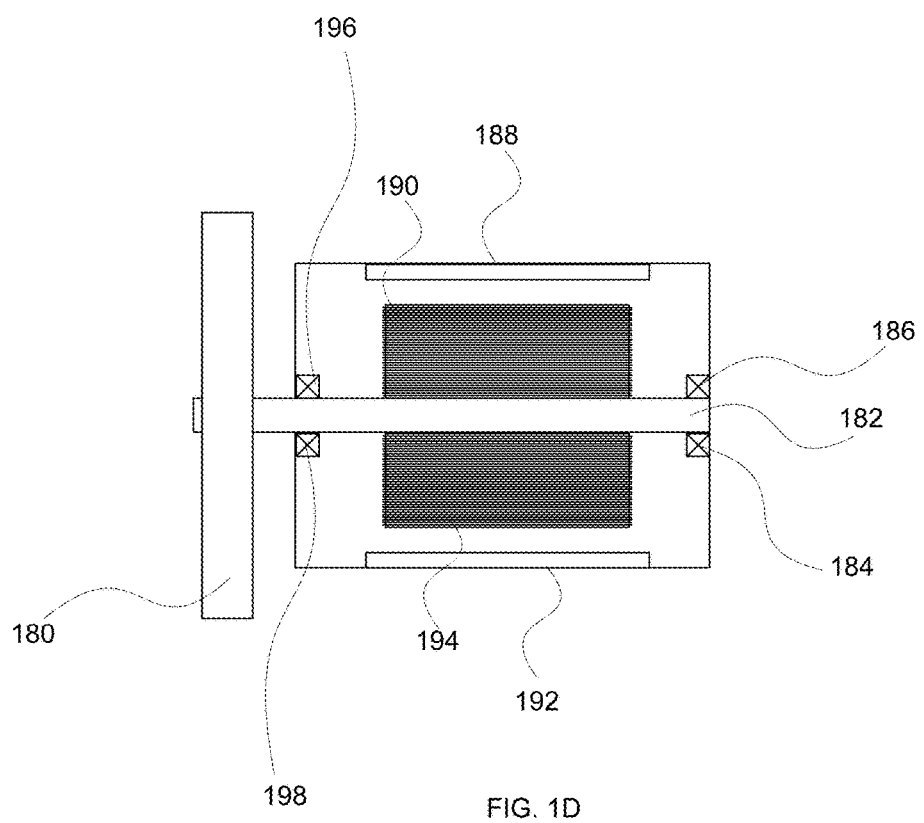
FIG. 1D is diagram illustrating an embodiment of a generator.

FIG. 1D is diagram illustrating an embodiment of a generator. In some embodiments, the generator of FIG. 1D is used to implement generator 122 of FIG. 1A. In the example shown, friction wheel 180 is affixed to axle 182 and turns axle 182. Axle 182 is affixed to coils (e.g., coil 190 and coil 194) that experience changing magnetic fields from magnet 188 and magnet 192 as the coils rotate on axle 182. Axle 182 rotates relative to the magnets of the stator (e.g., magnet 188 and magnet 192) using bearings (e.g., bearing 184, bearing 186, bearing 196, and bearing 198). The changing magnetic fields cause currents to flow in the coils and power to be generated from the rotation of friction wheel 180.

Figure 2:
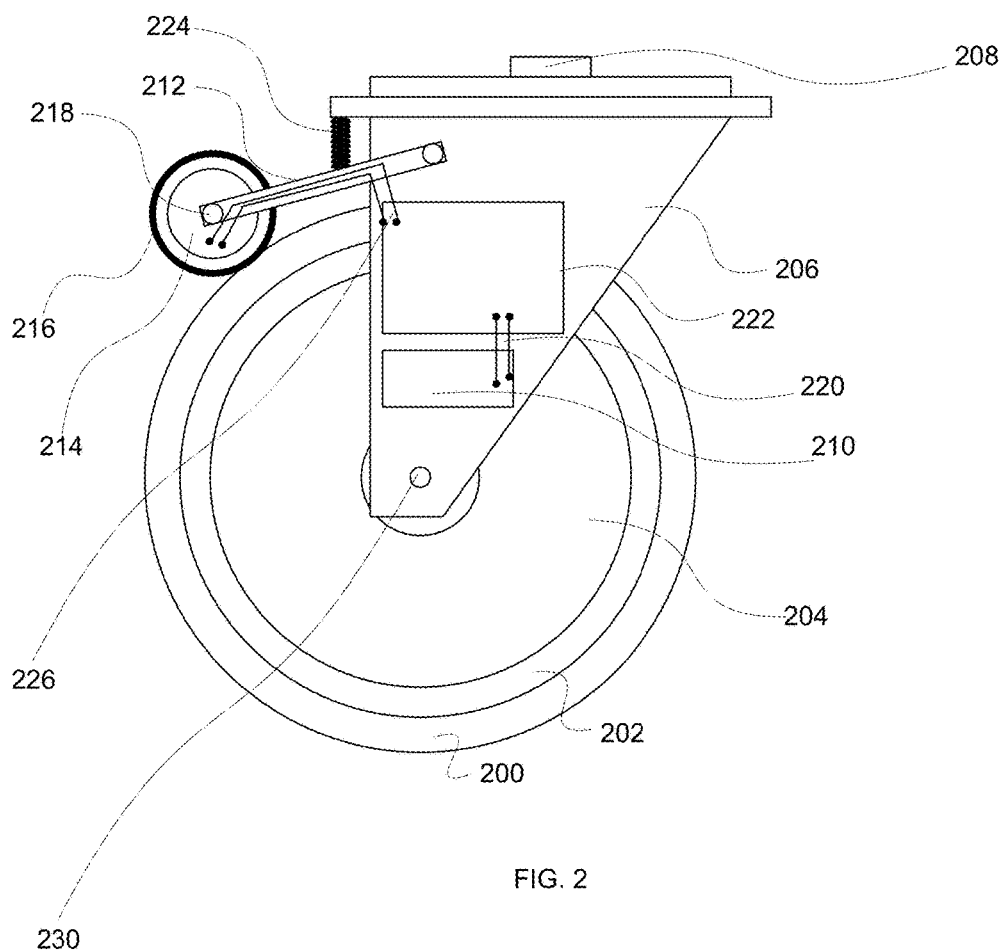
FIG. 2 is a diagram illustrating an embodiment of a cutaway view of a wheel unit.

FIG. 2 is a diagram illustrating an embodiment of a cutaway view of a wheel unit. In some embodiments, the wheel unit of FIG. 2 comprises a variation of the wheel unit as in FIG. 1A. In the example shown, wheel outer layer 200 is supported by wheel outer support 202 and wheel inner support 204. In various embodiments, wheel outer layer 200 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 200 rotates about axle 230 that is supported by axle support 206. In some embodiments, there are two axle supports—one on either side of the wheel. In some embodiments, there is one axle support—supporting the wheel in a cantilevered fashion. Axle 230 and axle support (e.g., axle support 206) are fixed and do not rotate with wheel outer layer 200 and wheel outer support 202. Wheel inner support 204 rotates with wheel outer layer 200 and wheel outer support 202 (e.g., a set of bearings enables rotation of wheel inner support 204). Friction wheel 216 is placed in contact with wheel outer layer 200 so that friction wheel 216 rotates when wheel outer layer 200 rotates. Contact is maintained between wheel outer layer 200 and friction wheel 216 using a force device (e.g., spring 224) and arm mount 212. Friction wheel 216 rotates with generator axle 218 to turn a rotor with respect to a stator of generator 214 to generate power. Generator 214 parasitically generates power off of the motion of outer wheel layer 200 to power circuits of circuit unit 222 directly or indirectly using a battery (e.g., battery 210). Generator 214 is connected to circuit unit 222 via connectors 226. Power is used to charge battery 210. In some embodiments, generator 214 is directly connected to battery 210. Battery 210 is connected to circuit unit 222 via connectors 220. Circuit unit 222 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 222, generator 214, and battery 210 are fixed to axle support 206, and/or axle and do not rotate with wheel outer layer 200.

In various embodiments, the location sensor unit and the wireless communication unit (e.g., as part of circuit unit 222) are enclosed and affixed to axle support 206 or axle so as not be removable or disabled. In some embodiments, circuit unit 222 and battery 210 are enclosed in a case that is a part of axle support 206 to appear as part of axle support 206. Pivot 208 enables rotation of the wheel unit about a mounting pivot.

Figure 3:
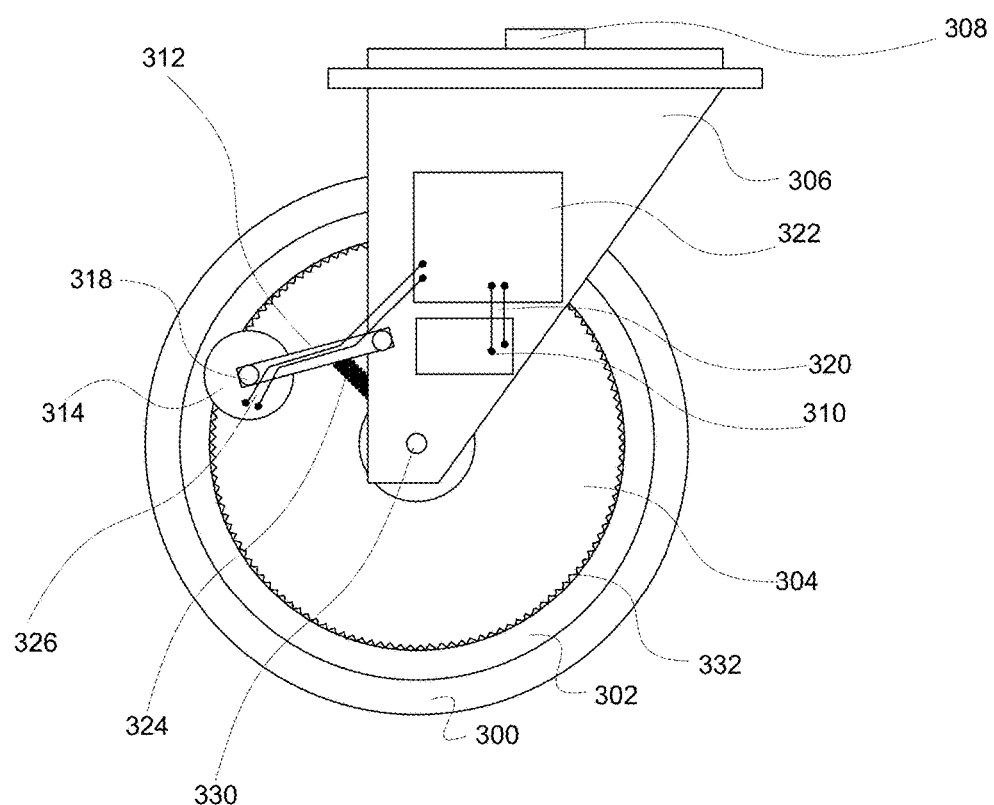
FIG. 3 is a diagram illustrating an embodiment of a side view of a wheel unit.

FIG. 3 is a diagram illustrating an embodiment of a side view of a wheel unit. In some embodiments, the wheel unit of FIG. 3 comprises a variation of the wheel unit as in FIG. 1A. In the example shown, wheel outer layer 300 is supported by wheel outer support 302 and wheel inner support 304. In various embodiments, wheel outer layer 300 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 300 rotates about axle 330 that is supported by axle support 306. In some embodiments, there are two axle supports—one on either side of the wheel. In some embodiments, there is one axle support—supporting the wheel in a cantilevered fashion. Axle 330 and axle support (e.g., axle support 306) are fixed and do not rotate with wheel outer layer 300 and wheel outer support 302. Wheel inner support 304 rotates with wheel outer layer 300 and wheel outer support 302 (e.g., a set of bearings enables rotation of wheel inner support 304). Inner gear wheel (not shown) is placed in contact with wheel outer support gearing 332 so that inner gear wheel rotates when wheel outer layer 300 rotates. Contact is maintained between inner gear wheel and wheel outer support gearing 332 using a force device (e.g., spring 324) and arm mount 312. Inner gear wheel rotates with generator axle 318 to turn a rotor with respect to a stator of generator 314 to generate power. Generator 314 parasitically generates power off of the motion of outer wheel layer 300 to power circuits of circuit unit 322 directly or indirectly using a battery (e.g., battery 310). Generator 314 is connected to circuit unit 322 via connectors 326. Power is used to charge battery 310. In some embodiments, generator 314 is directly connected to battery 310. Battery 310 is connected to circuit unit 322 via connectors 320. Circuit unit 322 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 322, generator 314, and battery 310 are fixed to axle support 306, and/or axle and do not rotate with wheel outer layer 300.

In various embodiments, the location sensor unit and the wireless communication unit (e.g., as part of circuit unit 322) are enclosed and affixed to axle support 306 or axle so as not be removable or disabled. Pivot 308 enables rotation of the wheel unit about a mounting pivot.

Figure 4:
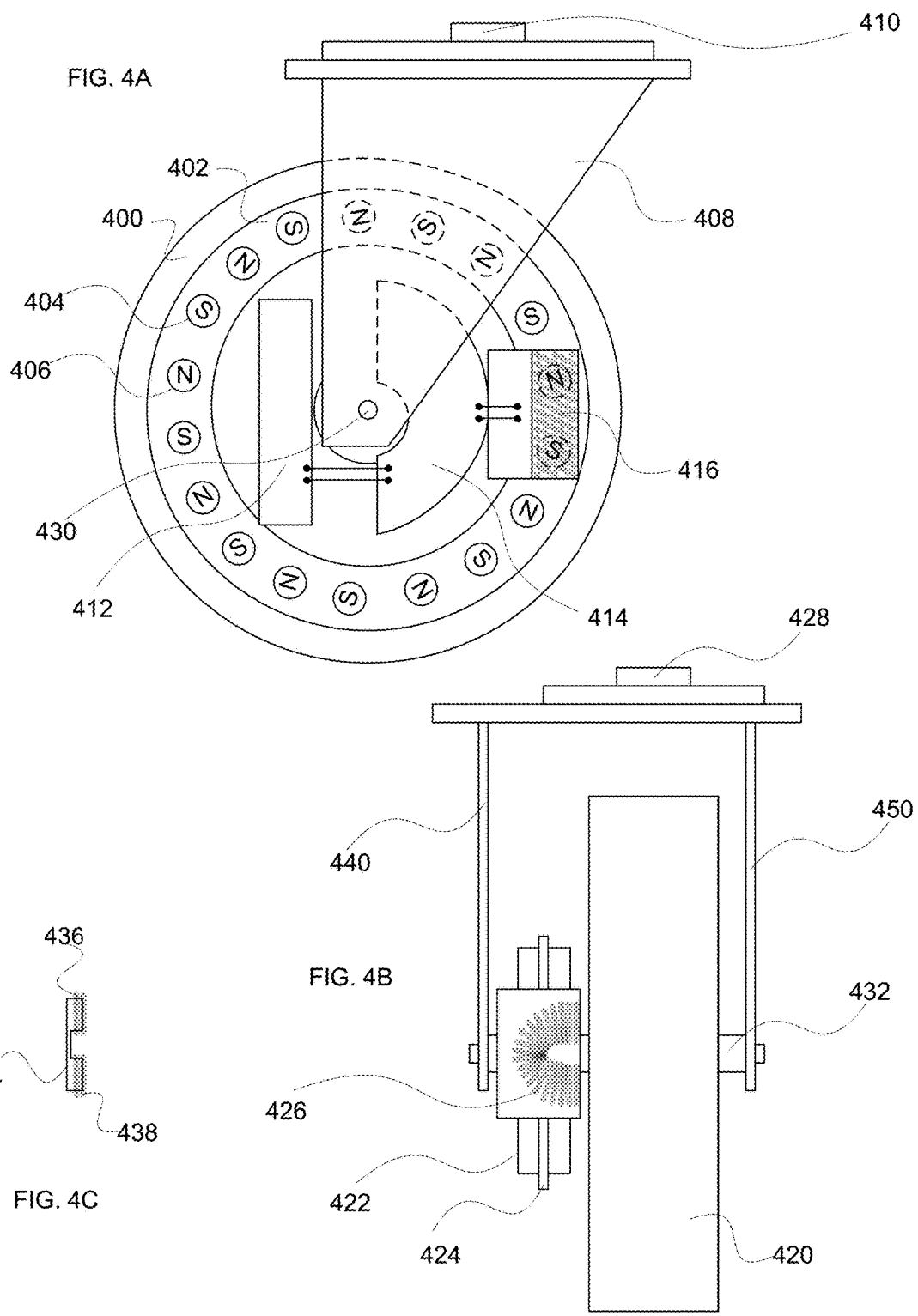
FIG. 4A is a diagram illustrating an embodiment of a side view of a wheel unit.
FIG. 4B is a diagram illustrating an embodiment of an end view of a wheel unit.
FIG. 4C is a diagram illustrating an embodiment of a side view of a winding.

FIG. 4A is a diagram illustrating an embodiment of a side view of a wheel unit. In some embodiments, the wheel unit of FIG. 4A comprises a variation of the wheel unit as in FIG. 1A. In the example shown, wheel outer layer 400 is supported by wheel outer support 402 and wheel inner support. In various embodiments, wheel outer layer 400 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 400 rotates about axle 430 that is supported by axle support 408. In some embodiments, there are two axle supports—one on either side of the wheel. In some embodiments, there is one axle support—supporting the wheel in a cantilevered fashion. Axle 430 and axle support (e.g., axle support 408) are fixed and do not rotate with wheel outer layer 400 and wheel outer support 402. Wheel inner support rotates with wheel outer layer 400 and wheel outer support 402 (e.g., a set of bearings enables rotation of wheel inner support). Magnets (e.g., south magnet 404 and north magnet 406) are affixed all around wheel outer support 402. The magnets rotate along with wheel outer layer 400 to move the magnets under windings 416 so that windings 416 experience changing magnetic fields. Windings 416 generate power due to the changing magnetic fields. The parasitically generated power generated off of the motion of outer wheel layer 400 is transmitted to power circuits of circuit unit 414 directly or indirectly using a battery (e.g., battery 412). Power is used to charge battery 412. In some embodiments, windings 416 are directly connected to battery 412. Battery 412 is connected to circuit unit 414 via connectors. Circuit unit 414 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 414, windings 416, and battery 412 are fixed to axle support 408, and/or axle 430 and do not rotate with wheel outer layer 400.

In various embodiments, the location sensor unit and the wireless communication unit (e.g., as part of circuit unit 414) are enclosed and affixed to axle support 408 or axle 430 so as not be removable or disabled. Pivot 410 enables rotation of the wheel unit about a mounting pivot.

FIG. 4B is a diagram illustrating an embodiment of an end view of a wheel unit. In some embodiments, the wheel unit of FIG. 4B comprises a different view of the wheel unit as in FIG. 4A. In the example shown, wheel outer layer 420 is supported by a wheel outer support and a wheel inner support. In various embodiments, wheel outer layer 420 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 420 rotates about axle 432 that is supported by axle support 450 and axle support 440. In some embodiments, there are two axle supports—one on either side of the wheel. In some embodiments, there is one axle support—supporting the wheel in a cantilevered fashion. Axle 450 and axle support (e.g., axle support 440 and axle support 450) are fixed and do not rotate with wheel outer layer 420 and wheel outer support. Wheel inner support rotates with wheel outer layer 420 and wheel outer support (e.g., a set of bearings enables rotation of wheel inner support). Magnets (not shown) are affixed all around wheel outer support. The magnets rotate along with wheel outer layer 420 to move the magnets under windings 426 so that windings 426 experience changing magnetic fields. Windings 426 generate power due to the changing magnetic fields. The parasitically generated power generated off of the motion of outer wheel layer 420 is transmitted to power circuits of circuit unit 424 directly or indirectly using a battery (e.g., battery 422). Power is used to charge battery 422. In some embodiments, windings 426 are directly connected to battery 422. Battery 422 is connected to circuit unit 424 via connectors. Circuit unit 424 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 424, windings 426, and battery 422 are fixed to axle support 440, and/or axle 432 and do not rotate with wheel outer layer 420.

In various embodiments, the location sensor unit and the wireless communication unit (e.g., as part of circuit unit 424) are enclosed and affixed to axle support 440 or axle 432 so as not be removable or disabled. Pivot 428 enables rotation of the wheel unit about a mounting pivot.

FIG. 4C is a diagram illustrating an embodiment of a side view of a winding. In some embodiments, winding of FIG. 4C is used to implement winding 416 of FIG. 4A. In the example shown, winding 436 and winding 438 are both wrapped around iron coupler 434.

Figure 5:
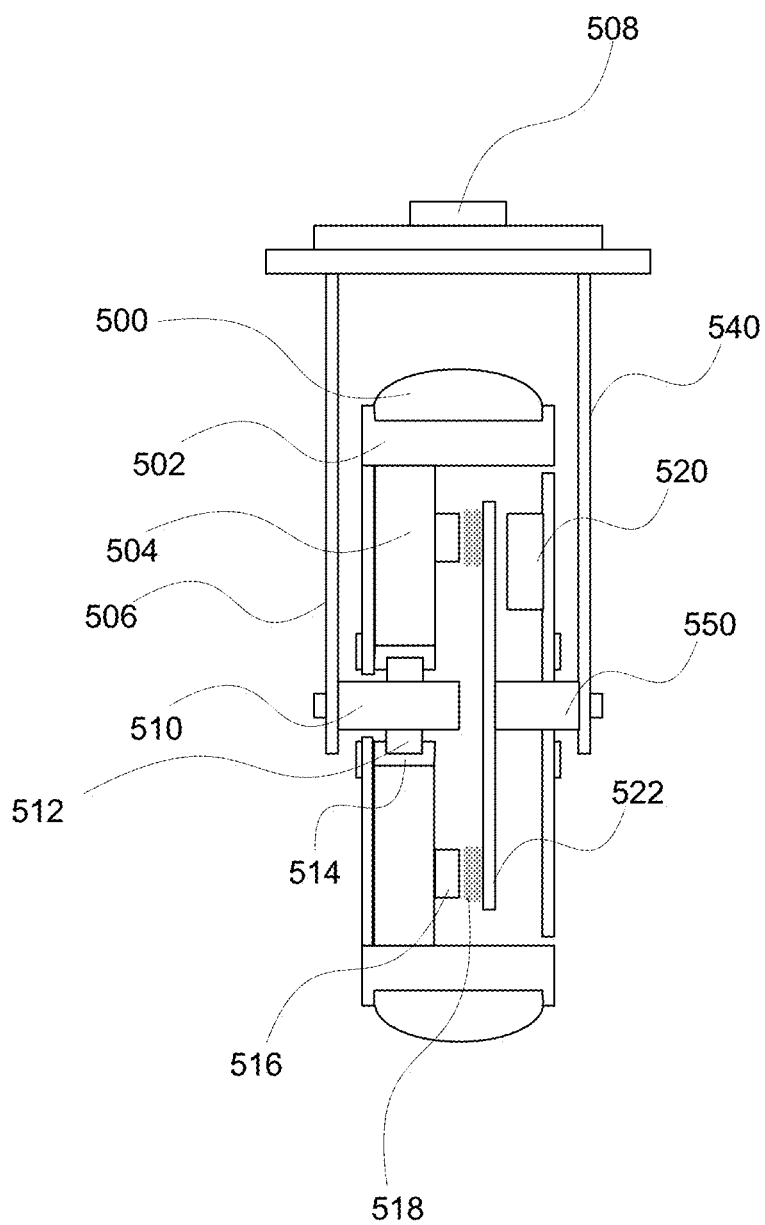
FIG. 5 is a diagram illustrating an embodiment of a cutaway view wheel unit.

FIG. 5 is a diagram illustrating an embodiment of a cutaway view wheel unit. In some embodiments, the wheel unit of FIG. 5 comprises an alternate of the wheel unit as in FIG. 4A. In the example shown, wheel outer layer 500 is supported by wheel outer support 502 and wheel inner support 504. In various embodiments, wheel outer layer 502 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 500 rotates about axle 510 that is supported by axle support 506 and axle support 540. There is one axle support using axle support 506—supporting the wheel in a cantilevered fashion. Axle 510 and axle support (e.g., axle support 506) are fixed and do not rotate with wheel outer layer 500 and wheel outer support 502. Wheel inner support 504 rotates with wheel outer layer 500 and wheel outer support 502 (e.g., a set of bearings—for example, bearing 512—enables rotation of wheel inner support 504). Magnets (e.g., magnet 516) are affixed all around wheel inner support 504. The magnets with alternating polarities rotate rotate along with wheel inner layer 504 to move the magnets under windings 518 so that windings 518 experience changing magnetic fields. Windings 518 generate power due to the changing magnetic fields. The parasitically generated power generated off of the motion of outer wheel layer 500 is transmitted to power circuits of circuit unit 522 directly or indirectly using a battery (e.g., battery 520). Power is used to charge battery 520. In some embodiments, windings 518 are directly connected to battery 520. Battery 520 is connected to circuit unit 522 via connectors. Circuit unit 522 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 522, windings 518, and battery 520 are fixed to axle support 540, and/or axle 550 and do not rotate with wheel outer layer 500.

In various embodiments, the location sensor unit and the wireless communication unit (e.g., as part of circuit unit 522) are enclosed and affixed to axle support 540 or axle 550 so as not be removable or disabled. Pivot 508 enables rotation of the wheel unit about a mounting pivot.

Figure 6:
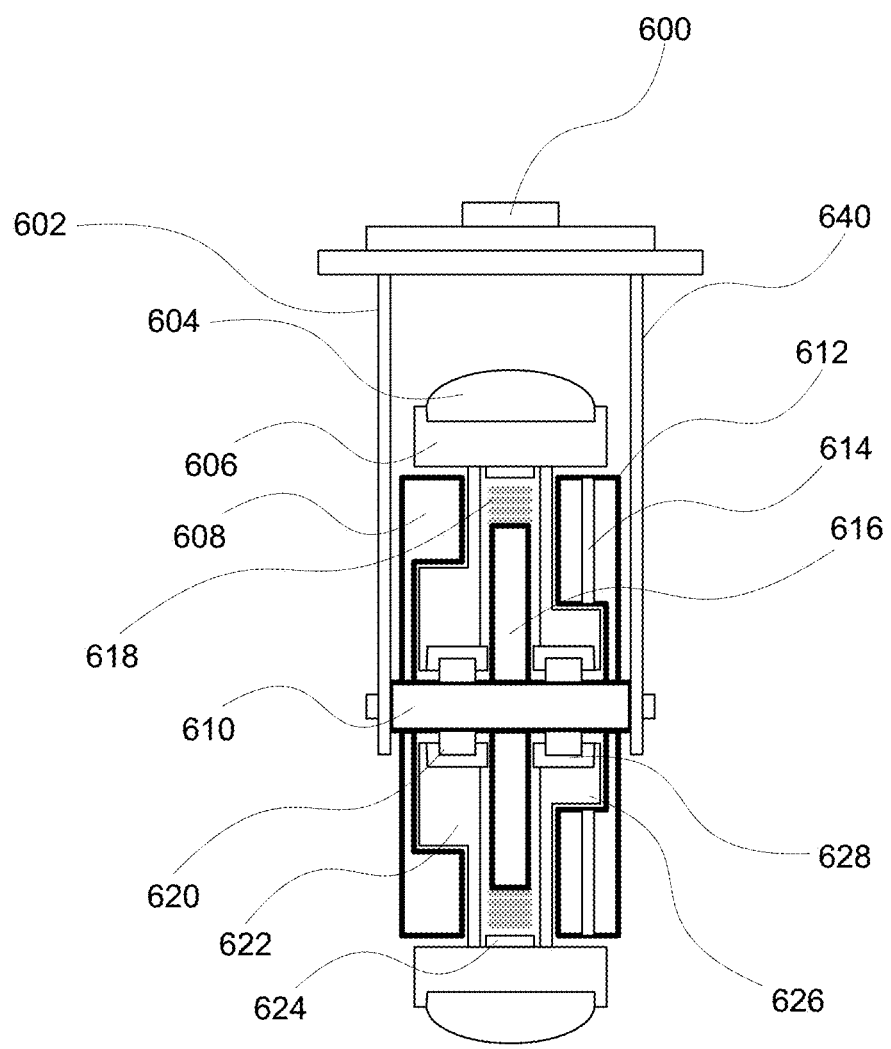
FIG. 6 is a diagram illustrating an embodiment of a cutaway view of a wheel unit.

FIG. 6 is a diagram illustrating an embodiment of a cutaway view of a wheel unit. In some embodiments, the wheel unit of FIG. 6 comprises an alternate of the wheel unit as in FIG. 4A. In the example shown, wheel outer layer 604 is supported by wheel outer support 606 and wheel inner support 626 and wheel inner support 622. In various embodiments, wheel outer layer 604 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 604 rotates about axle 610 that is supported by axle support 602 and axle support 640. Axle 610 and axle support (e.g., axle support 602 and axle support 640) are fixed and do not rotate with wheel outer layer 604 and wheel outer support 606. Wheel inner support 626 and wheel inner support 622 rotate with wheel outer layer 606 and wheel outer support 604 (e.g., a set of bearings—for example, bearing 620—in bearing support—for example, bearing support 628—enables rotation of wheel inner support 626 and wheel inner support 622). Magnets (e.g., magnet 624) are affixed all around inner circumference of wheel outer support 606. The magnets with alternating polarities rotate around with wheel outer support 606 to move the magnets adjacent to windings 618 so that windings 618 experience changing magnetic fields (e.g., an oscillating field). Windings 618 generate power due to the changing magnetic fields. The parasitically generated power generated off of the motion of outer wheel layer 604 is transmitted to power circuits of circuit unit 614 directly or indirectly using a battery. Power is used to charge the battery (not shown). In some embodiments, windings 618 are directly connected to the battery. The battery is connected to circuit unit 614 via connectors. Circuit unit 614 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 614, windings 618, and the battery are fixed to axle support 610, axle support 640, and/or axle 610 and do not rotate with wheel outer layer 604. Dummy plate 608 and circuit unit case 612 and winding support 616 are affixed to axle 610 and do not rotate with wheel outer layer 604.

In various embodiments, the location sensor unit and the wireless communication unit (e.g., as part of circuit unit 614) are enclosed and affixed and integral and not readily visible to axle support 640 or axle 610 so as not be removable or disabled. Pivot 600 enables rotation of the wheel unit about a mounting pivot.

Figure 7A:
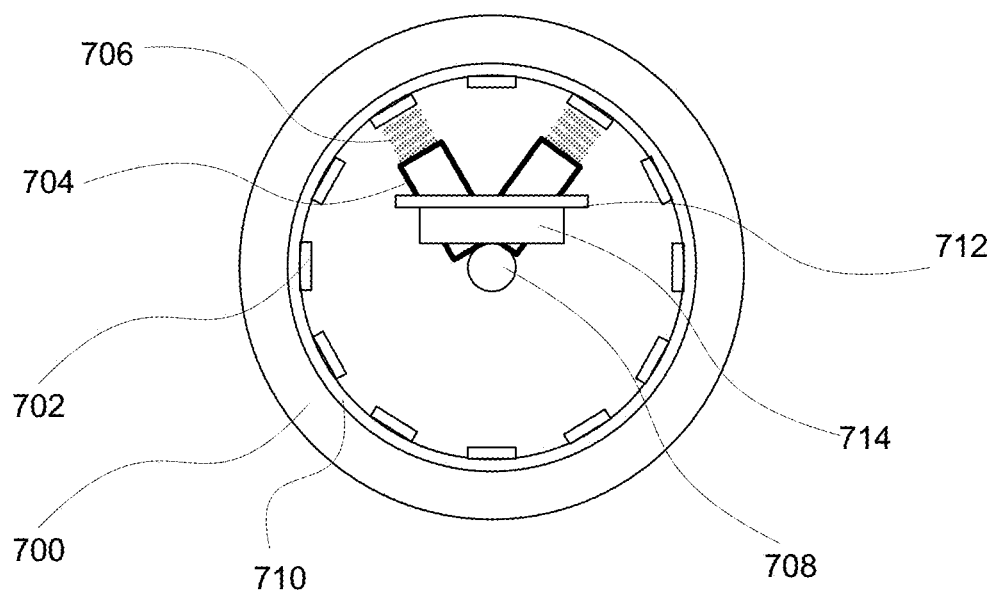
FIG. 7A is a diagram illustrating an embodiment of a cutaway view of a wheel unit.

FIG. 7A is a diagram illustrating an embodiment of a cutaway view of a wheel unit. In some embodiments, the wheel unit of FIG. 7A comprises an alternate of the wheel unit as in FIG. 4A. In the example shown, wheel outer layer 700 is supported by wheel outer support 710. In various embodiments, wheel outer layer 700 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 700 rotates about axle 708 that is supported by axle supports. Axle 708 is fixed and does not rotate with wheel outer layer 700. Wheel outer layer 700 and wheel outer support 710 rotate around axle 708 using a set of bearings. Magnets (e.g., magnet 702) are affixed all around inner circumference of wheel outer support 710. The magnets with alternating polarities rotate around with wheel outer support 710 to move the magnets adjacent to windings 706 so that windings 706 experience changing magnetic fields (e.g., an oscillating field). Windings 706 are supported by support 704. Windings 706 generate power due to the changing magnetic fields. The parasitically generated power generated off of the motion of outer wheel layer 710 is transmitted to power circuits of circuit unit 712 directly or indirectly using battery 714. Power is used to charge the battery 714. In some embodiments, windings 706 are directly connected to the battery. Battery 714 is connected to circuit unit 712 via connectors. Circuit unit 712 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 712, windings 706, and battery 714 are fixed to axle support 708 and do not rotate with wheel outer layer 700.

In various embodiments, the location sensor unit and the wireless communication unit (e.g., as part of circuit unit 712) are enclosed and affixed and integral and not readily visible to an axle support or axle 708 so as not be removable or disabled.

Figure 7B:
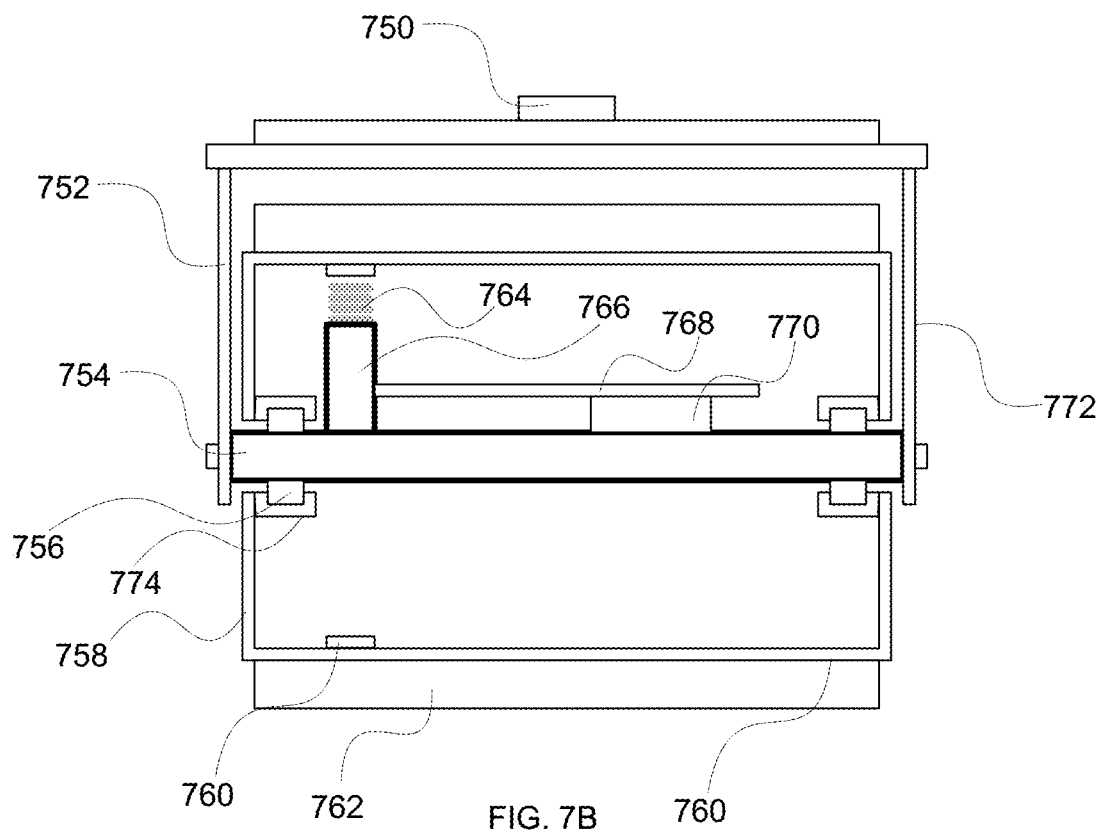
FIG. 7B is a diagram illustrating an embodiment of a cutaway view of a wheel unit.

FIG. 7B is a diagram illustrating an embodiment of a cutaway view of a wheel unit. In some embodiments, the wheel unit of FIG. 7B comprises an orthogonal cutaway view of the wheel unit of FIG. 7A. In the example shown, wheel outer layer 762 is supported by wheel outer support 760 and wheel inner support 758. In various embodiments, wheel outer layer 762 is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel outer layer 762 rotates about axle 754 that is supported by axle support 752 and axle support 772. Axle 754 and axle support (e.g., axle support 752 and axle support 772) are fixed and do not rotate with wheel outer layer 762 and wheel outer support 760. Wheel inner support 758 rotate with wheel outer layer 762 and wheel outer support 760 (e.g., a set of bearings—for example, bearing 756—in bearing support—for example, bearing support 774—enables rotation of wheel inner support 758). Magnets (e.g., magnet 760) are affixed all around inner circumference of wheel outer support 760. The magnets with alternating polarities rotate around with wheel outer support 760 to move the magnets adjacent to windings 764 so that windings 764 experience changing magnetic fields (e.g., an oscillating field). Windings 764 are supported using support 766. Windings 764 generate power due to the changing magnetic fields. The parasitically generated power generated off of the motion of outer wheel layer 760 is transmitted to power circuits of circuit unit 768 directly or indirectly using battery 770. Power is used to charge battery 770. In some embodiments, windings 764 are directly connected to battery 770. Battery 770 is connected to circuit unit 768 via connectors. Circuit unit 768 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. Circuit unit 768, windings 764, and the battery are fixed to axle support 752, axle support 772, and/or axle 754 and do not rotate with wheel outer layer 762.

In various embodiments, the location sensor unit and the wireless communication unit (e.g., as part of circuit unit 768) are enclosed and affixed and integral and not readily visible to axle support 752 or axle 754 so as not be removable or disabled. Pivot 750 enables rotation of the wheel unit about a mounting pivot.

Figure 7C:
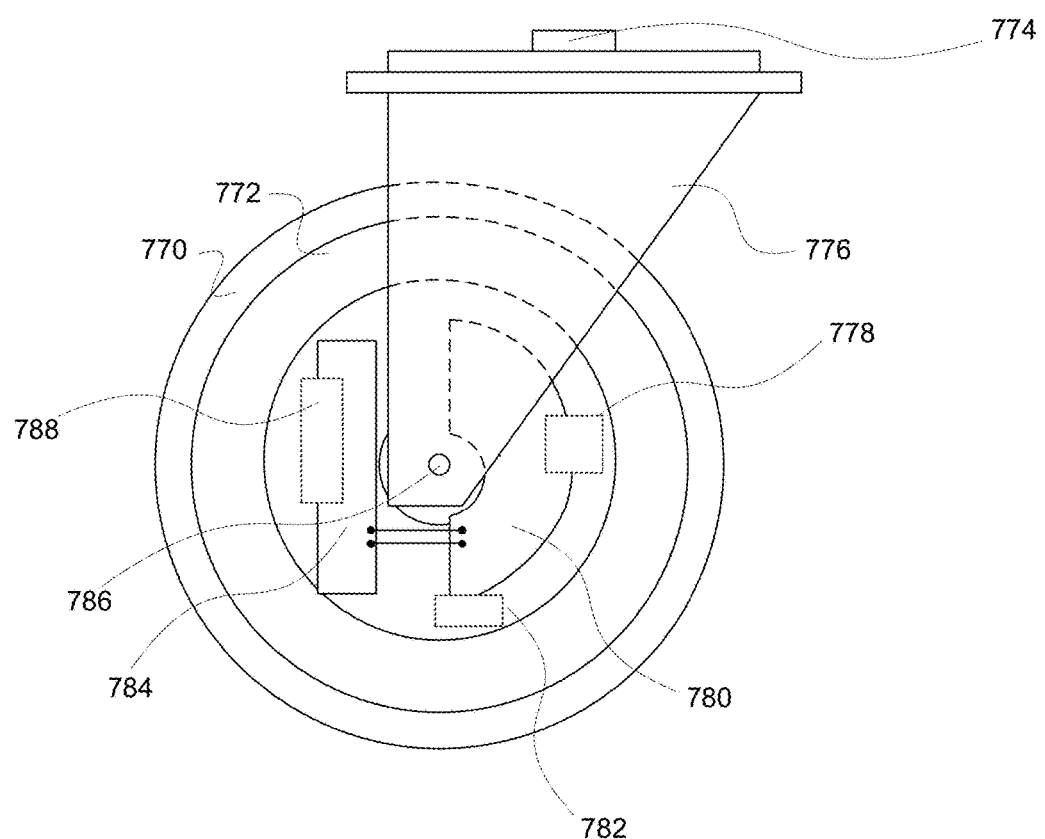
FIG. 7C is a diagram illustrating an embodiment of wheel unit.

FIG. 7C is a diagram illustrating an embodiment of wheel unit. In some embodiments, wheel unit of FIG. 7C shows antenna placements for wheel unit of FIG. 4A, FIG. 5, and FIG. 6. In the example shown, wheel outer layer 770 supported by outer support 772. Wheel outer layer 770 and outer support 772 rotate about axle 786. Axle 786 is supported using axle support 776. Pivot 774 enables rotation of the wheel unit about a mounting pivot. Circuit unit 780 is coupled to battery 784 and is affixed to either axle 786 and/or axle support 776. Circuit unit 780 and battery 784 do not rotate around axle 786 and have a fixed position relative to axle support 776. Placement outlines associated with antennas are shown. In some embodiments, antennas are attached to a dummy plate affixed to axle 786 or axle support 776. Location sensor antenna 778 (e.g., a GPS antenna) is located facing up towards satellites for improved reception. Communication antenna 788 (e.g., a cellular communication antenna) faces outwards to maximize reception to cellular towers in the horizontal plane. Short range antenna 782 (e.g., Bluetooth low energy antenna) in a location maximizing distance away from communication antenna 788 and location sensor antenna 778 (e.g., a triangle).

Figure 7D:
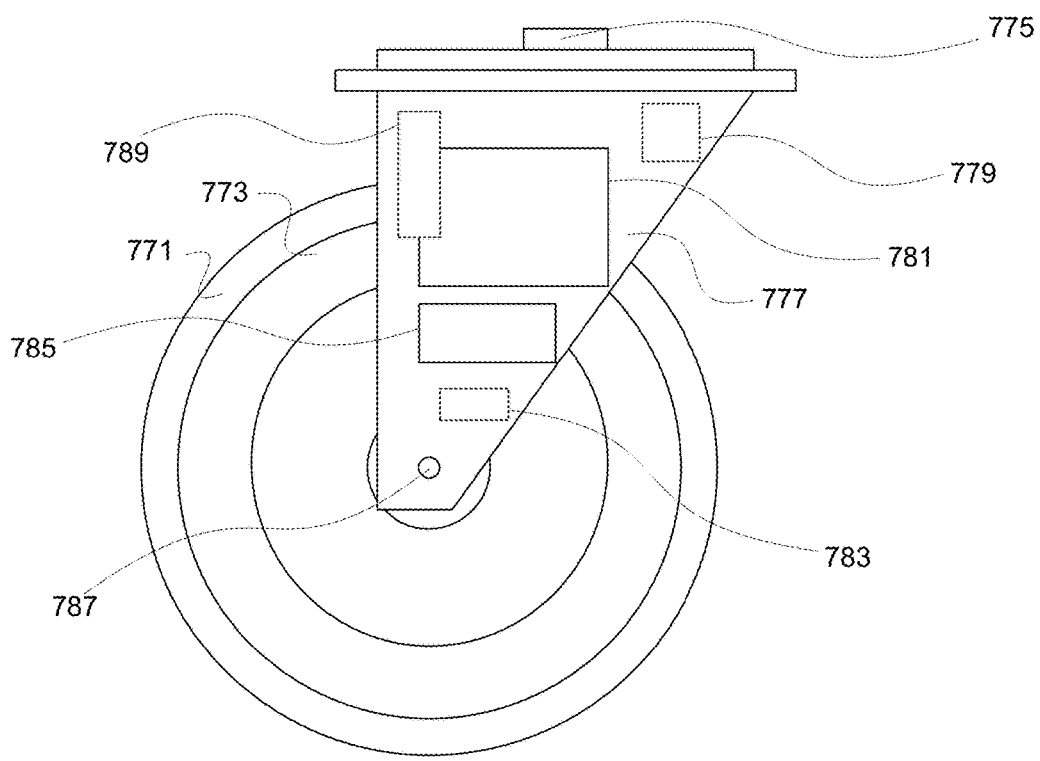
FIG. 7D is a diagram illustrating an embodiment of wheel unit.

FIG. 7D is a diagram illustrating an embodiment of wheel unit. In some embodiments, wheel unit of FIG. 7D shows antenna placements for wheel unit of FIG. 2 and FIG. 3. In the example shown, wheel outer layer 771 supported by outer support 773. Wheel outer layer 771 and outer support 773 rotate about axle 787. Axle 787 is supported using axle support 777. Pivot 775 enables rotation of the wheel unit about a mounting pivot. Circuit unit 781 is coupled to battery 785 and is affixed to either axle 787 and/or axle support 777. Circuit unit 781 and battery 785 do not rotate around axle 787 and have a fixed position relative to axle support 777. Placement outlines associated with antennas are shown. In some embodiments, antennas are attached to a dummy plate affixed to axle 787 or axle support 777. Location sensor antenna 779 (e.g., a GPS antenna) is located facing up towards satellites for improved reception. Communication antenna 789 (e.g., a cellular communication antenna) faces outwards to maximize reception to cellular towers in the horizontal plane. Short range antenna 783 (e.g., Bluetooth low energy antenna) in a location maximizing distance away from communication antenna 789 and location sensor antenna 779 (e.g., a triangle).

Figure 8A:
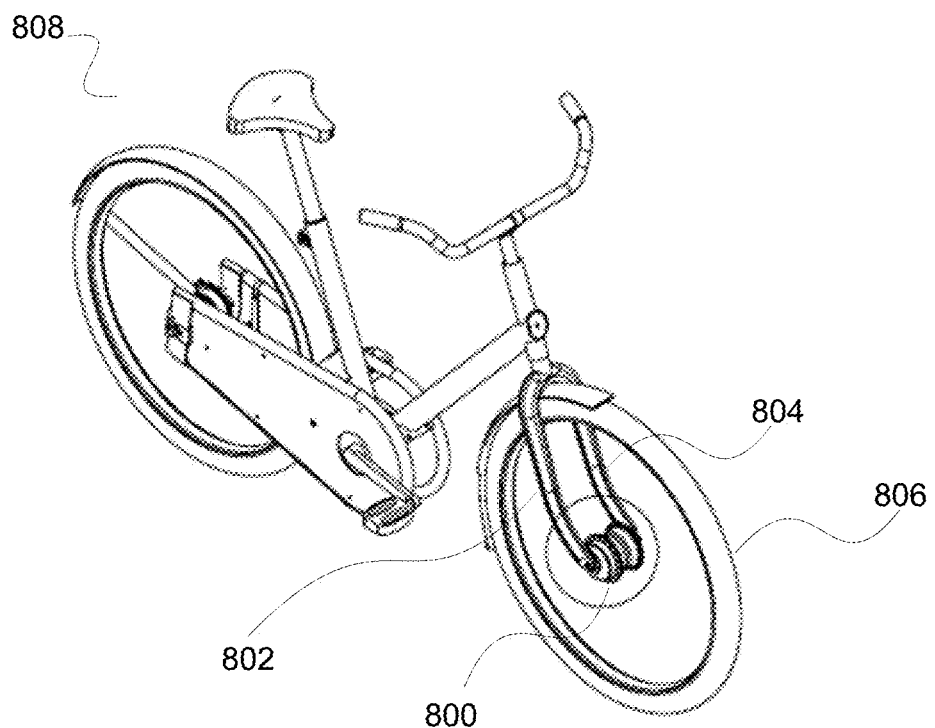
FIG. 8A is a diagram illustrating an embodiment of a mobile item with a wheel unit.

FIG. 8A is a diagram illustrating an embodiment of a mobile item with a wheel unit. In the example shown, mobile item 808 comprises a bicycle. Front tire 806 is attached to mobile item 808 via fork stem 802 and fork stem 804 by attachment of a wheel unit 800. Spokes attach front tire and rim to wheel unit 800.

Figure 8B:
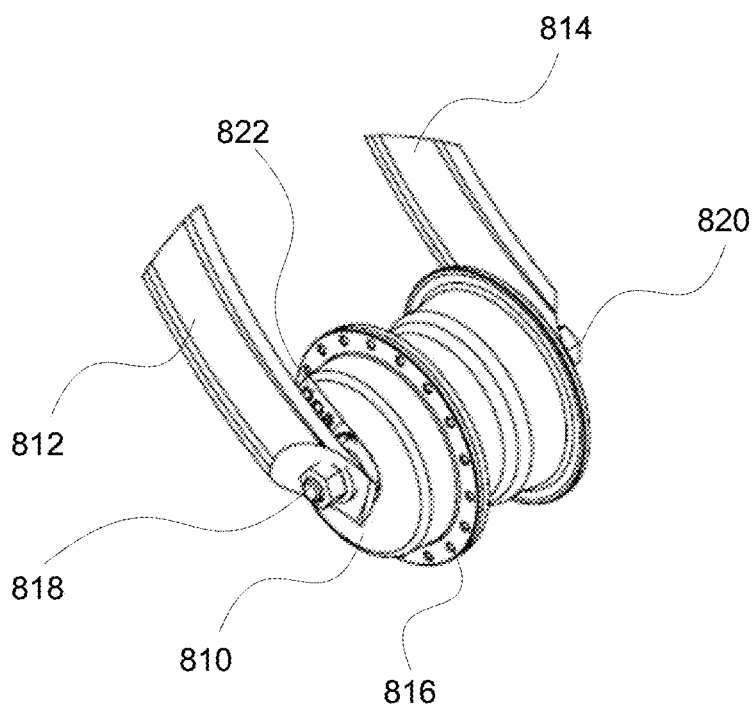
FIG. 8B is a diagram illustrating an embodiment of a wheel unit.

FIG. 8B is a diagram illustrating an embodiment of a wheel unit. In some embodiments, wheel unit 810 comprises wheel unit 800 of FIG. 8A. In the example shown, wheel unit 810 attaches to a tire via spokes. Each spoke connects to wheel unit 810 using spoke hole (e.g., spoke hole 816). Wheel unit 810 attaches to a mobile item (e.g., a bicycle) using bolt 818 and bolt 820 that affix fork 812 and fork 814 to an axle that goes through wheel unit 810. Indent 822 makes space for fork 812 when wheel unit 810 is affixed to fork 812.

Figure 8C:
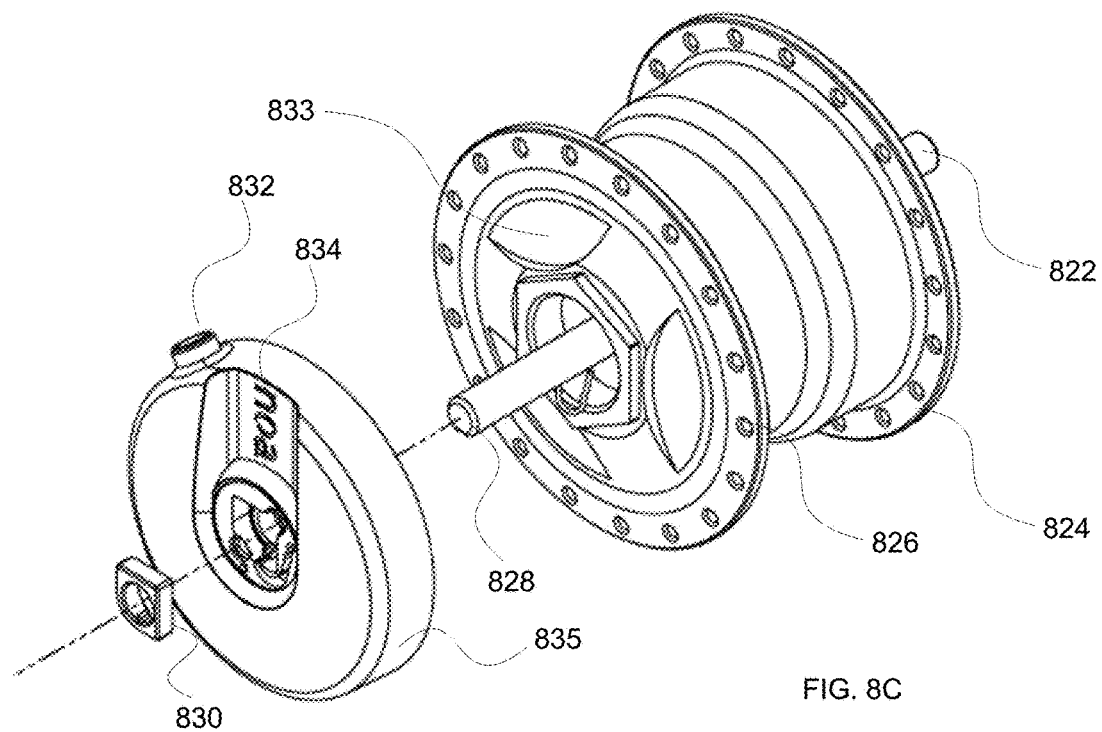
FIG. 8C is a diagram illustrating an embodiment of a wheel unit.

FIG. 8C is a diagram illustrating an embodiment of a wheel unit. In some embodiments, the wheel unit of FIG. 8C is comprises wheel unit 800 of FIG. 8A. In the example shown, an axle have axle end 828 and axle end 822. Axle end 828 and axle end 822 are each used to attach to a fork of a mobile unit (e.g., a bicycle). Spoke holes (e.g., spoke hole 826) as part of outer rim 824 rotate around the axle. Inner core 833 is fixed with respect to the axle and does not rotate around the axle. The rotation of outer rim 824 about inner core 833 and the axle are used to generate power. Power is provided to the components in the enclosure cap using a wire conductor placed adjacent to the axle. Enclosure cap 835 is held in place using position nut 830. Enclosure cap 835 does not rotate around the axle. Enclosure cap 835 has indent 834 for a fork mount of the wheel unit. Connector 832 enables external connection to a circuit unit inside enclosure cap 835.

Figure 8D:
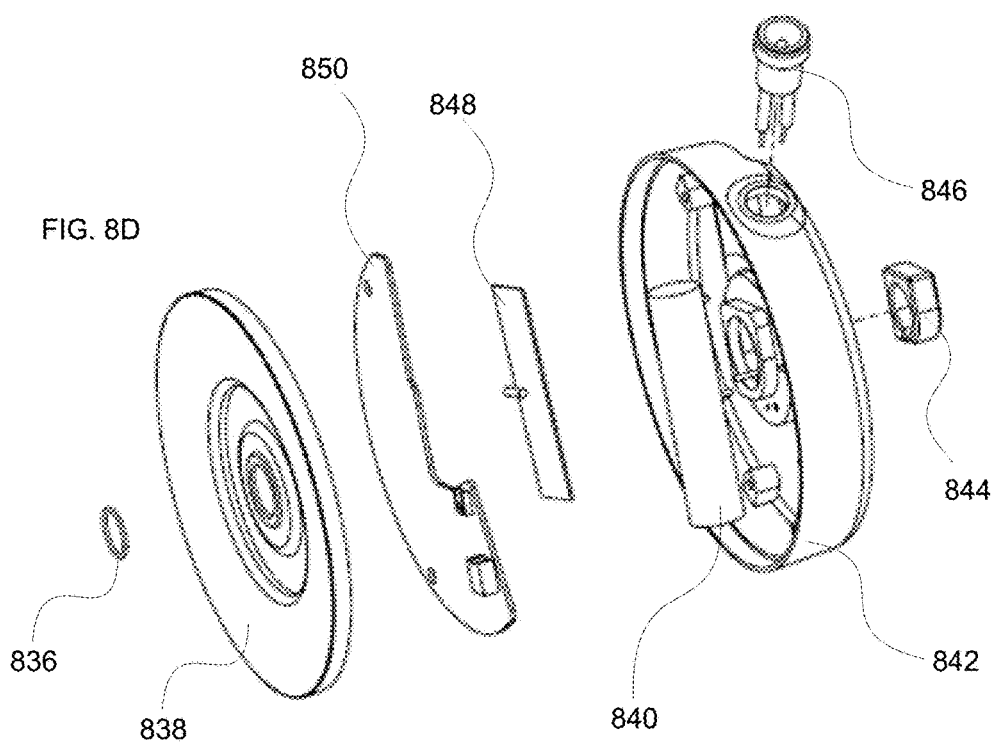
FIG. 8D is a diagram illustrating an embodiment of an exploded view of components in an enclosure cap.

FIG. 8D is a diagram illustrating an embodiment of an exploded view of components in an enclosure cap. In some embodiments, the enclosure cap of FIG. 8D is used to implement components associated with enclosure cap 835 of FIG. 8C. In the example shown, washer 836 is for positioning sealing plate 838 around an axle of a wheel unit. Position nut 844 is for positioning enclosure cap 842 around the axle of the wheel unit with a fixed orientation with respect to the axle. Sealing plate 838 and enclosure cap 842 enclose circuit unit 850, antenna 848, and battery 840 to protect from dust, dirt, and moisture. Circuit unit 850 includes a location sensor unit and a wireless communication unit. In various embodiments, location sensor unit comprises a global positioning sensor, an ultra-wideband (UWB) position sensor, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system. The components inside the enclosure created by enclosure cap 842 and sealing plate 838 do not rotate and maintain a fixed orientation with respect to a fork or wheel support. Antenna 848 is positioned so as to be accessible to radio frequency signals necessary for transmitting and/or receiving (e.g., not occluded by the fork or wheel support). In various embodiments, enclosure cap 842 and/or sealing plate 838 are made from non-conducting materials—for example, plastic, fiber glass, etc.) or any other appropriate material. Connector 846 enables transmission of power external to the wheel unit.

Figure 8E:
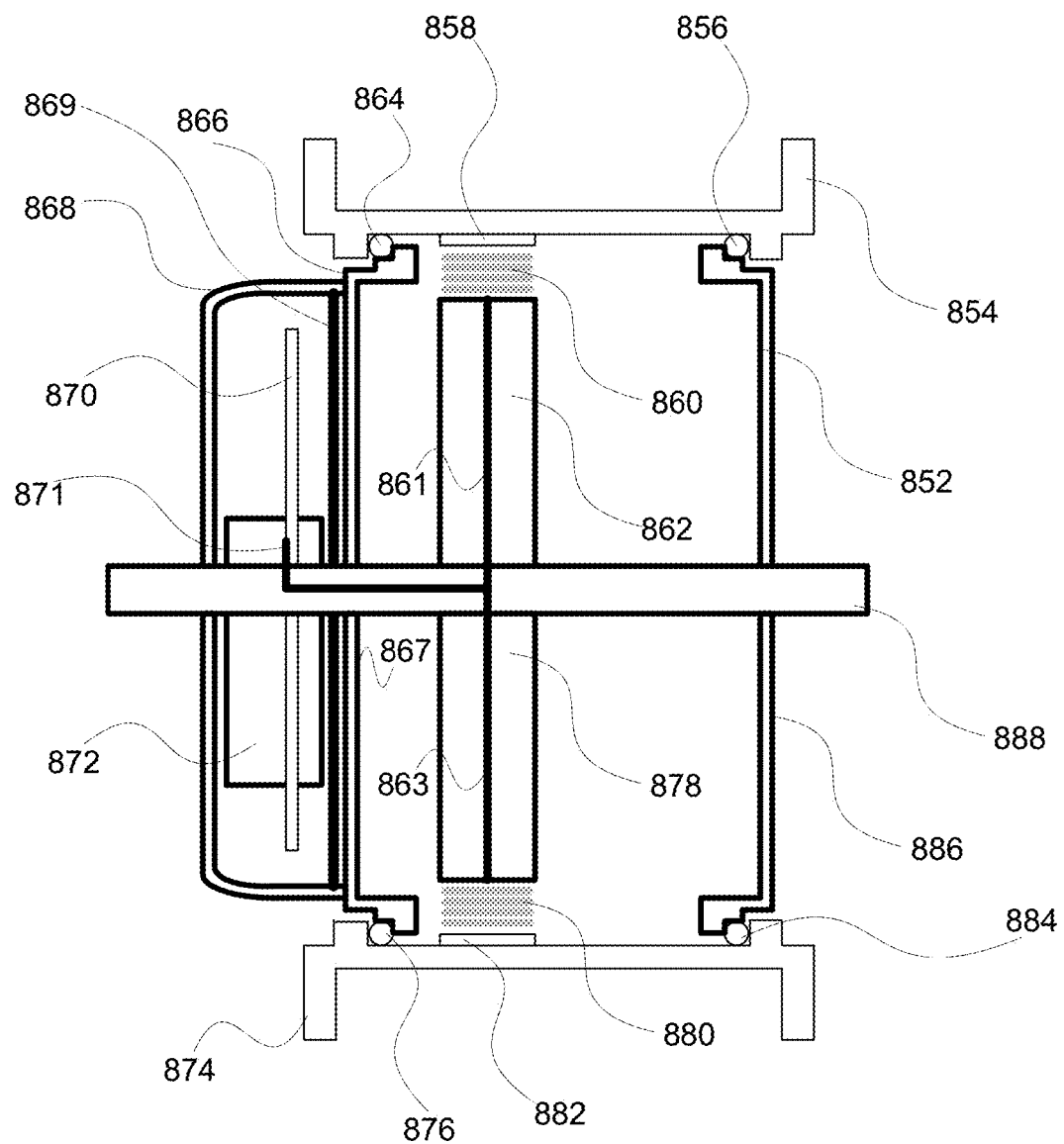
FIG. 8E is a diagram illustrating an embodiment of a cutaway view of a wheel unit.

FIG. 8E is a diagram illustrating an embodiment of a cutaway view of a wheel unit. In some embodiments, the wheel unit of FIG. 8E is used to implement the wheel unit of FIG. 8A, FIG. 8B, FIG. 8C, or FIG. 8D. In some embodiments, the wheel unit of FIG. 8E comprises an alternate of the wheel unit as in FIG. 4A. In the example shown, a tire is connected to wheel support 854 and wheel support 874 using spokes. In various embodiments, the tire is comprised of one or more of the following: an inflatable tire (e.g., a rubber inflatable tire), an inner tube and a tire (e.g., a rubber inner tube and an outer tire), a solid wheel (e.g., a solid rubber wheel, a solid plastic wheel, a solid metal wheel, a nylon/elastomer wheel, etc.), or any other appropriate outer wheel layer. Wheel support 854 and wheel support 874 rotates about axle 888 and inner support 852, inner support 866, inner support 867, and inner support 886 using bearing 856, bearing 864, bearing 876, and bearing 884. Magnets (e.g., magnet 858 and magnet 882) are affixed all around inner circumference of wheel support 854 and wheel support 874. The magnets with alternating polarities rotate around with wheel support 854 and wheel support 874 to move the magnets adjacent to windings 860 and windings 880 so that windings 860 and windings 880 experience changing magnetic fields (e.g., an oscillating field). Windings 860 and windings 880 generate power due to the changing magnetic fields. The parasitically generated power generated off of the motion of wheel support 854 and wheel support 874 is transmitted to power circuits of circuit unit 870 directly or indirectly using battery 872. Power is used to charge battery 872. In some embodiments, windings 860 and windings 880 are directly connected to battery 872 (e.g., using conductor 861, conductor 863, and conductor 871, which is a wire disposed along the wheel axle). Battery 870 is connected to circuit unit 870 via connectors. Circuit unit 870 includes a location sensor unit and a wireless communication unit. In various embodiments, location sensor unit comprises a global positioning sensor, an ultra-wideband (UWB) position or, or any other appropriate position sensor. In various embodiments, wireless communication unit comprises one or more of the following: a cellular communication unit, a Wi-Fi® communication unit, a Bluetooth® communication unit, a low power wide area network (LPWAN—for example, LoRaWAN®), or any other appropriate communication unit. The wireless communication unit is able to transmit coordinates determined using location sensor to a server system (e.g., to a receiving server). Circuit unit 870, windings 860, windings 880, winding support 862, winding support 878, inner support 852, inner support 866, inner support 867, inner support 886, enclosure cap 868, sealing plate 869, and battery 872 are fixed to axle 888 and do not rotate with wheel support 854 and wheel support 874. Cap 868 provides space for battery 872, a wireless communication unit, and a location sensor unit.

Figure 8F:
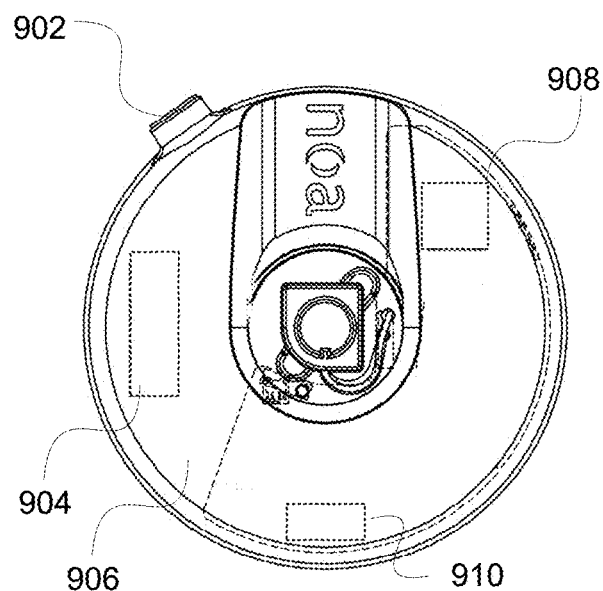
FIG. 8F is a diagram illustrating an embodiment of wheel unit.

FIG. 8F is a diagram illustrating an embodiment of wheel unit. In some embodiments, wheel unit of FIG. 8F shows antenna placements for wheel unit 8E. In the example shown, enclosure cap 906 is shown with placement outlines associated with antennas located inside enclosure cap 906. Location sensor antenna 908 (e.g., a GPS antenna) is located facing up towards satellites for improved reception. Location sensor antenna 908 is isolated from connector port 902 to minimize interference from connector port 902 to detection of a signal for the location sensor. Communication antenna 904 (e.g., a cellular communication antenna) faces outwards to maximize reception to cellular towers in the horizontal plane. Communication antenna 904 is less susceptible to interference than the other antennas so it is placed closer to connector port 902. Short range antenna 910 (e.g., Bluetooth low energy antenna) in a location maximizing distance away from communication antenna 904 and location sensor antenna 908 (e.g., a triangle).

Figure 9:
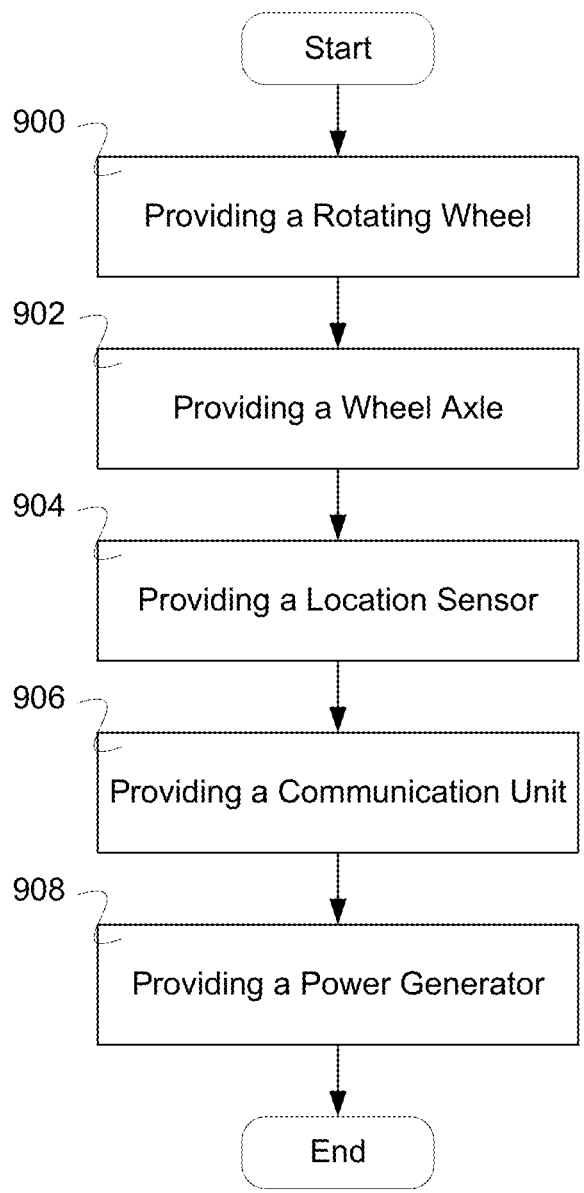
FIG. 9 is a flow diagram illustrating an embodiment of a process for providing a wheel unit.

FIG. 9 is a flow diagram illustrating an embodiment of a process for providing a wheel unit. In some embodiments, the process of FIG. 9 is associated with providing a wheel unit (e.g., a wheel unit of FIG. 1A, FIG. 1B, FIG. 1C, FIG. 2, FIG. 3, FIG. 4A, FIG. 4B, FIG. 5, FIG. 6, FIG. 7A, FIG. 7B, FIG. 7C, FIG. 7D, FIG. 8B, FIG. 8C, FIG. 8D, FIG. 8E, and FIG. 8F). In the example shown, in 900 a rotating wheel is provided. In 902, a wheel axle is provided. In 904, a location sensor is provided. In 906, a communication unit is provided. In 908, a power generator is provided.

Figure 10:
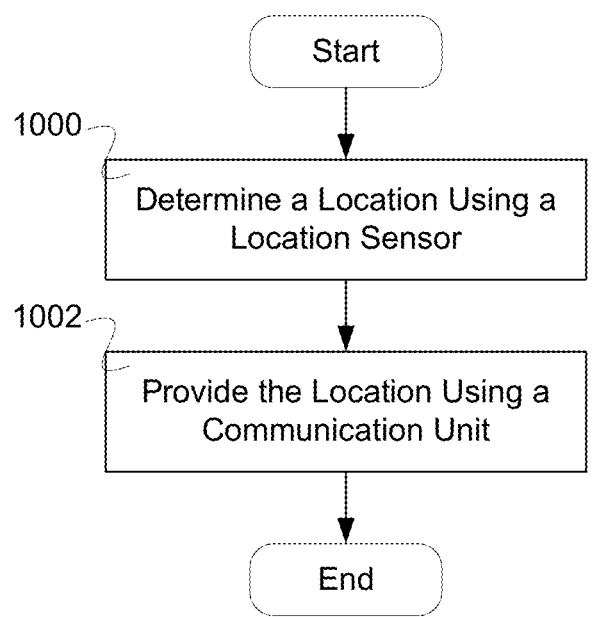
FIG. 10 is a flow diagram illustrating an embodiment of a process for providing a location.

FIG. 10 is a flow diagram illustrating an embodiment of a process for providing a location. In some embodiments, the process of FIG. 10 is associated with providing a location using a wheel unit (e.g., a wheel unit of FIG. 1A, FIG. 1B, FIG. 1C, FIG. 2, FIG. 3, FIG. 4A, FIG. 4B, FIG. 5, FIG. 6, FIG. 7A, FIG. 7B, FIG. 7C, FIG. 7D, FIG. 8B, FIG. 8C, FIG. 8D, FIG. 8E, and FIG. 8F). In the example shown, in 1000 a location is determined using a location sensor. In 1002, the location is provided using a communication unit. In some embodiments, the location sensor and the communication unit are powered using a power generator that uses the motion of a wheel of the wheel unit to generate power.

Figure 11A:
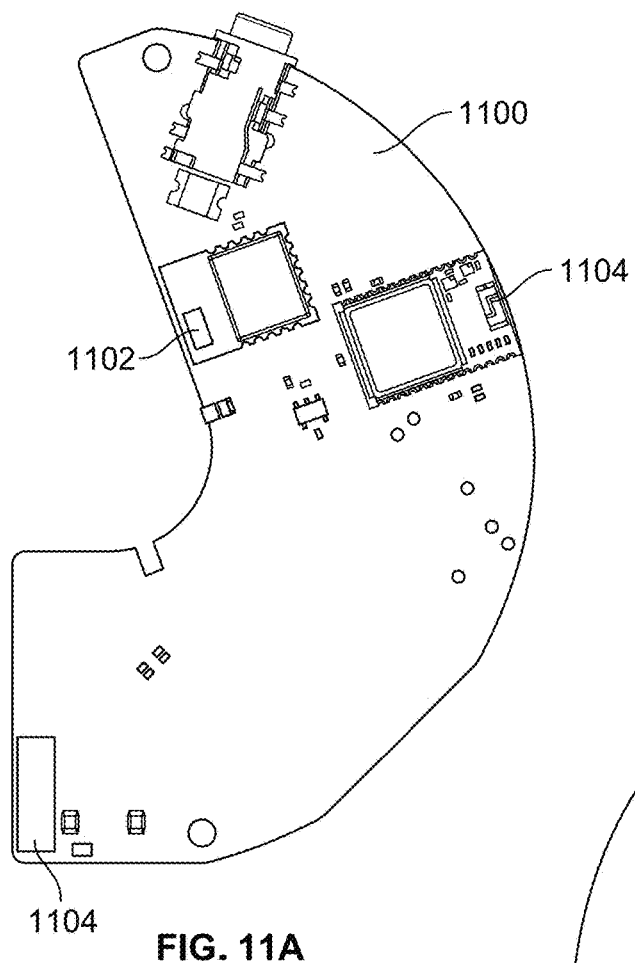
FIG. 11A is a diagram illustrating an embodiment of a circuit board.
Figure 11B:
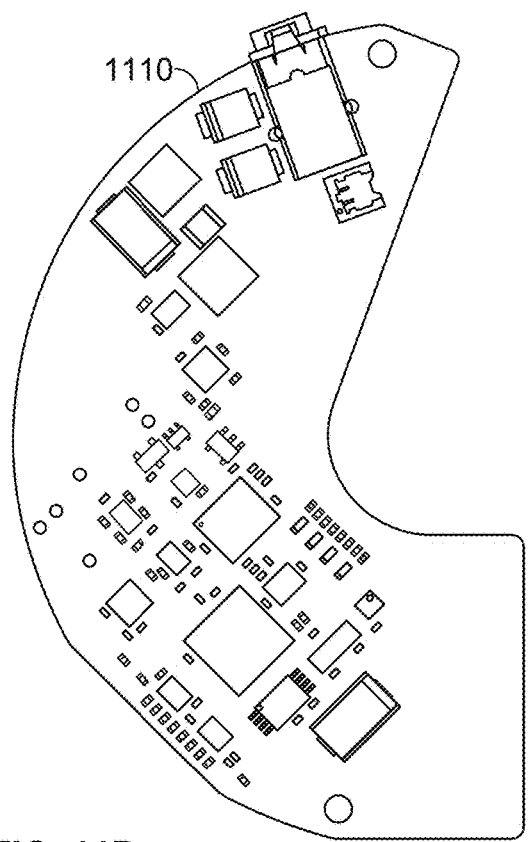
FIG. 11B is a diagram illustrating an embodiment of a circuit board.

FIGS. 11A and 11B are a pair of diagrams illustrating an embodiment of a circuit board comprising the communication unit and location sensor amongst other components. In some embodiments this circuit board is fitted into or along with a wheel unit. In the example shown, top view 1100 and bottom view 1110 shows an embodiment of a circuit board that includes connectors, power management circuits, microcontroller circuits, level shifter circuits, cellular circuits including cellular antenna 1104, accelerometer circuits, Bluetooth circuits including Bluetooth antenna 1102, and GPS circuits including GPS antenna 1104.

Figure 12:
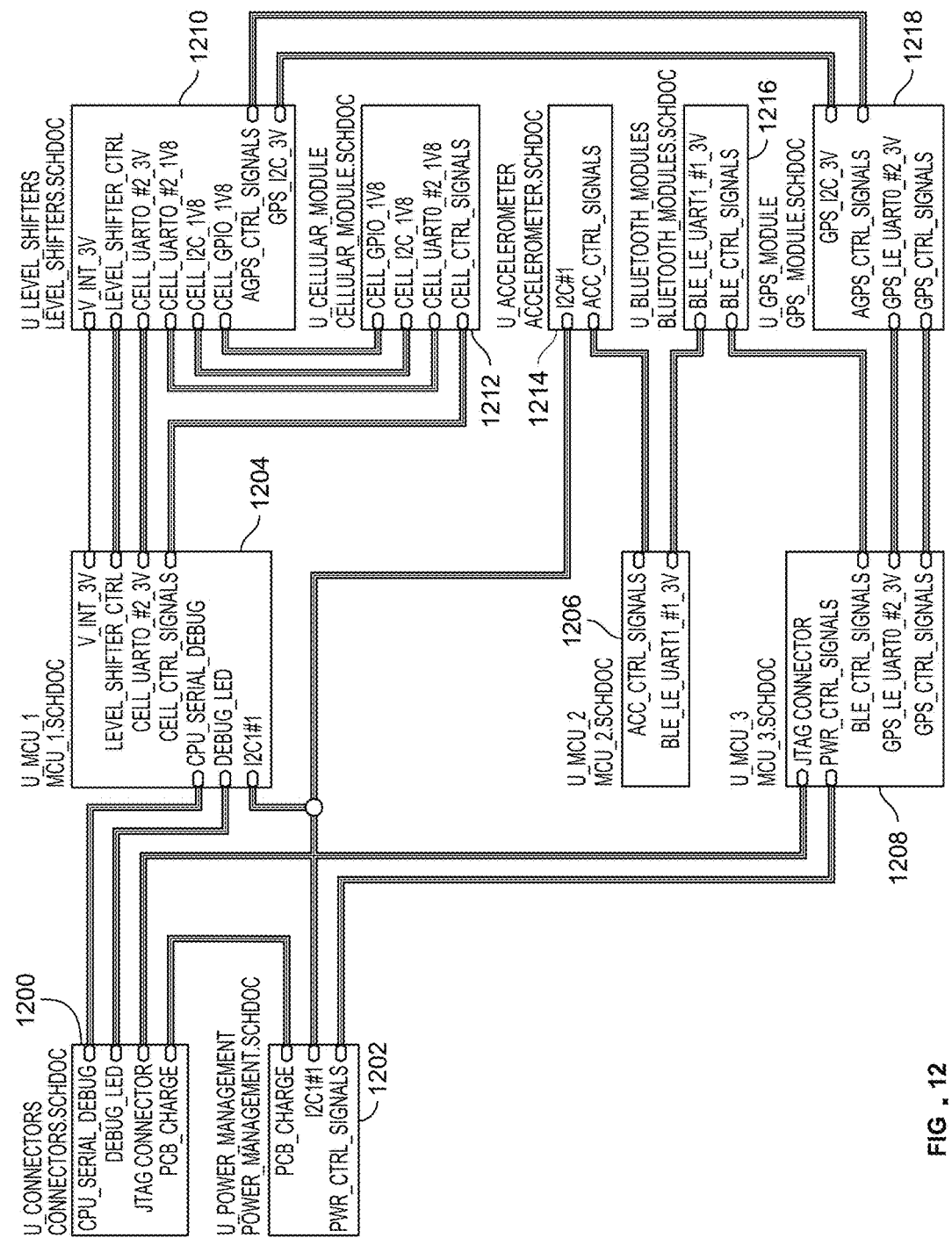
FIG. 12 is a block diagram illustrating an embodiment of a circuit board.

FIG. 12 is a block diagram illustrating an embodiment of a circuit for sensing and location detection. In some embodiments, the circuit of FIG. 12 is used to implement the circuit associated with the circuit of FIG. 11A or FIG. 11B. In the example shown, connectors 1200 receive AC power from a dynamo that generates power using motion of a wheel. Power management 1202 converts received power to DC. Microcontroller 1204, microcontroller 1206, and microcontroller 1208 receive data, process data, and provide data for transmission to a server. Level shifter 1210 translate signal voltage levels between microcontrollers and peripherals (e.g., sensors, communications circuits, etc.). Cellular module 1212 that receives and transmits data with a cloud server system. Accelerometer 1214 detects acceleration—for example, start of motion and/or stop of motion for the wheel. Bluetooth module 1216 is used for local debugging communication and/or indoor location ranging. GPS module 1218 is used for outdoor ranging. In some embodiments, it is determined whether indoor or outdoor signals are available (e.g., Bluetooth and/or GPS signals) and based on the signals, determine location and/or position information (e.g., 3D coordinate location).

A wheel unit with spindle mounted tracking device is disclosed. The wheel unit comprises a rotating wheel, a wheel axle, and a location sensor. The rotating wheel rotates with respect to the wheel axle. The location sensor is disposed to a fixed position with respect to the wheel axle. The location sensor determines Cartesian coordinates to locate the wheel unit.

In some embodiments, a wheel unit with a spindle mounted communication unit is disclosed. The wheel unit comprises a rotating wheel, a wheel axle, and a communication unit. The rotating wheel rotates with respect to the wheel axle. A wireless communication unit, wherein the wireless communication unit is attached to an antenna, wherein the antenna is disposed in a fixed position with respect to the spindle.

In some embodiments, a wheel unit that identifies position is disclosed. The wheel unit includes a location sensor and a communication unit. The location sensor determines the wheel location (e.g., coordinates associated with the wheel enabling the determination of a location for the wheel unit). The communication unit provides the wheel location to a server (e.g., the coordinates of the wheel unit—for example, longitude and latitude, are transmitted to a server via wireless communications—for example, cellular communication). In some embodiments, multiple communication modules are included with the communication unit.

In some embodiments, the wheel unit is attached to a mobile item. However, a user may want to acquire or use the mobile item in an unauthorized way or to take it away with them. In this case, any tracking of the unit or device involved in tracking the unit should not be able to be disabled or removed.

In various embodiments, the wheel unit comprises a castor, a bicycle wheel, a cart wheel, a mobile unit wheel, or any other appropriate mobile item.

In some embodiments, the motion of the mobile item is used to generate power for the location sensor and the communication unit.

In some embodiments, a wheel unit comprises a rotating wheel, a wheel axle, and a location sensor. The rotation wheel rotates with respect to the wheel axle and spindle. The location sensor is disposed in a fixed position with respect to the wheel axle. The location sensor determines coordinates for a location of the wheel unit. In some embodiments, the wheel unit includes a wireless communication unit. In some embodiments, the wireless communication unit is configured to transmit the location of the wheel unit.

In some embodiments, the wheel unit includes a power generator. In some embodiments, the power generator that generates power using rotation of the rotating wheel with respect to the wheel axle. In some embodiments, power generator charges a battery. In some embodiments, the battery powers the location sensor. In some embodiments, the power generator comprises a friction wheel that turns the power generator using the rotating wheel to turn the friction wheel. In some embodiments, the power generator comprises a gear that turns the power generator using the rotating wheel to turn the gear. In some embodiments, the power generator comprises uses detected changing magnetic fields to generate power as the rotating wheel rotates. In some embodiments, the rotating wheel includes a plurality of fixed magnets used to create the changing magnetic fields. In some embodiments, the location sensor is attached to the wheel axle. In some embodiments, the location sensor is attached to an axle support.

In some embodiments, a wheel unit includes a rotating wheel, a wheel axle, and a wireless communication unit. The rotating wheel rotates with respect to the wheel axle. The wireless communication unit is attached to an antenna. The antenna is disposed in a fixed position with respect to the wheel axle. In some embodiments, the wheel unit includes a location sensor. In some embodiments, the location sensor is disposed in a fixed position with respect to the wheel axle. In some embodiments, the location sensor senses a location of the wheel unit.

In some embodiments, the wheel unit may communicate bi-directionally we a remote computer. In doing so, it may transmit information, including, but not limited to, velocity, direction, location and system status to the remote computer.

In some embodiments, the wheel unit contains a magnetic sensor, to provide the communication unit and remote server with direction information:

A magnetic sensor or compass provides cardinal directions enabling detection of orientation (in the absence of motion) and direction of travel (in the absence of GPS).

A gyroscopic sensor may be used in place of a magnetic sensor or compass when the magnetic flux due to the dynamo saturates the ambient magnetic field In some embodiments, the wheel unit contains a light sensor, to detect ambient light and aid in reporting of unauthorized access based on time access information. The detection of light may also be used to trigger a safety alert on the remote server.

In some embodiments, the wheel unit contains environmental sensors to monitor and report air quality to the remote server.

Environmental sensors in the system provide convenient low cost environmental data collection distributed throughout a campus without significant infrastructure investment.

The sensors are located in the wheel for installation and integration simplicity. But maybe located anywhere on the moving asset.

In some embodiments, the wheel unit may communicate with a local graphical, including but not limited to a liquid crystal display to provide system feedback or operation state to an operator.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A wheel unit, comprising:
   a rotating wheel;
   a wheel axle, wherein the rotating wheel rotates with respect to the wheel axle;
   a power generator, wherein the power generator generates power using rotation of the rotating wheel with respect to the wheel axle, wherein the power generator uses detected changing magnetic fields to generate power as the rotating wheel rotates; and a location sensor, wherein the location sensor is disposed in a fixed position with respect to the wheel axle, and wherein the location sensor determines coordinates for a location of the wheel unit.

2. The wheel unit as in claim 1, further comprising a wireless communication unit, wherein the wireless communication unit is configured to transmit the location of the wheel unit.

3. The wheel unit as in claim 2, wherein the wireless communication unit is attached to a communication antenna, wherein the communication antenna is disposed in a fixed position with respect to the wheel axle.

4. The wheel unit as in claim 1, wherein the rotating wheel includes a plurality of fixed magnets used to create the changing magnetic fields.

5. The wheel unit as in claim 1, wherein the power generator charges a battery.

6. The wheel unit as in claim 5, wherein the battery powers the location sensor.

7. The wheel unit as in claim 1, wherein the location sensor is attached to the wheel axle.

8. The wheel unit as in claim 7, wherein the location sensor is connected to a location antenna that is disposed in a fixed position with respect to the wheel axle.

9. The wheel unit as in claim 1, wherein the wheel unit is part of a bicycle.

10. The wheel unit as in claim 1, wherein a power generator is electrically connected to the battery using a wire along the wheel axle.

11. The wheel unit as in claim 1, wherein the wheel has a cantilevered support.

12. The wheel unit as in claim 11, wherein a cap has an indent aligned with the cantilevered support.

13. The wheel unit as in claim 1, wherein a location determined using the location sensor is provided to a wireless communication unit to be communicated to a receiving server.

14. A wheel unit as in claim 1, wherein a cap is attached to the wheel axle to provide space for a battery, a wireless communication unit, and a location sensor.

15. A method for providing a wheel unit, comprising:
providing a rotating wheel;
providing a wheel axle, wherein the rotating wheel rotates with respect to the wheel axle;
providing a power generator, wherein the power generator generates power using rotation of the rotating wheel with respect to the wheel axle, wherein the power generator uses detected changing magnetic fields to generate power as the rotating wheel rotates; and
providing a location sensor, wherein the location sensor is disposed in a fixed position with respect to the wheel axle, and wherein the location sensor determines coordinates for a location of the wheel unit.

* * * * *